United States Patent [19]
Katoh et al.

[11] Patent Number: 5,211,128
[45] Date of Patent: May 18, 1993

[54] AUTOMOTIVE METER DEVICE HAVING SELF-ACTING LIGHT-EMITTING POINTER

[75] Inventors: Miki Katoh, Kariya; Kaoru Matsuno, Gifu; Akihiko Inoue, Kariya; Katsuhiro Kumazawa, Anjo, all of Japan

[73] Assignee: Nippondenso Co., Ltd., Kariya, Japan

[21] Appl. No.: 677,395

[22] Filed: Mar. 29, 1991

[30] Foreign Application Priority Data

| Mar. 29, 1990 | [JP] | Japan | 2-82194 |
| Jul. 12, 1990 | [JP] | Japan | 2-184685 |
| Nov. 30, 1990 | [JP] | Japan | 2-338501 |

[51] Int. Cl.⁵ .......................................... G01D 13/26
[52] U.S. Cl. .................................... 116/288; 116/332
[58] Field of Search ............... 116/286, 284, 287, 288, 116/305, 327, 328, 330, 332, DIG. 6, DIG. 36, 62.1, 62.3, 62.4; 439/13, 18, 683, 685, 535; 313/512, 500; 73/499; 362/23, 800

[56] References Cited

U.S. PATENT DOCUMENTS

| 3,031,635 | 4/1962 | Gluck | 439/683 X |
| 3,219,008 | 11/1965 | Harris et al. | 116/288 X |
| 3,818,278 | 6/1974 | Adler | 439/683 X |
| 4,163,428 | 8/1979 | Kshikawa | 116/288 |
| 4,252,078 | 2/1981 | Fukasawa et al. | 116/DIG. 5 X |
| 4,257,084 | 3/1981 | Reynolds | 362/800 X |
| 4,630,183 | 12/1986 | Fujita | 362/226 X |
| 4,727,648 | 3/1988 | Savage, Jr. | 439/683 X |
| 4,918,582 | 4/1990 | McIngvale, Jr. et al. | 362/217 |
| 5,038,255 | 8/1991 | Nishihashi et al. | 362/226 X |
| 5,050,045 | 9/1991 | Kato et al. | 116/288 X |

FOREIGN PATENT DOCUMENTS

1-277718 11/1989 Japan .

Primary Examiner—William A. Cuchlinski, Jr.
Assistant Examiner—John L. Beres
Attorney, Agent, or Firm—Cushman, Darby & Cushman

[57] ABSTRACT

An automobile meter device of the type having a self-acting light-emitting needle or pointer is disclosed in which first and second current supply terminals connected with first and second electrodes of a light-emitting element are disposed on opposite side of a pointer boss. The current supply terminals include plug-in sockets extending parallel to a longitudinal axis of the pointer shaft. When the pointer boss is fitted over a meter shaft to assemble the pointer with a pointer drive unit, the sockets are automatically fitted over connector pins of fourth current supply terminals which are connected with a power source. With this construction, the meter can be assembled efficiently with utmost ease. The pointer boss may be electrically conductive and connected with one of the electrodes of the light-emitting element in which instance one of the current supply terminals may be omitted.

33 Claims, 21 Drawing Sheets

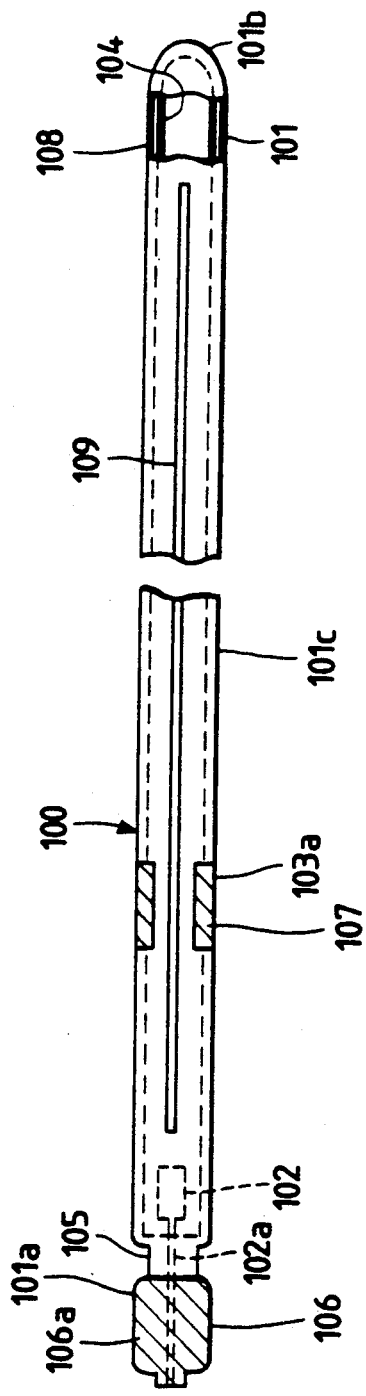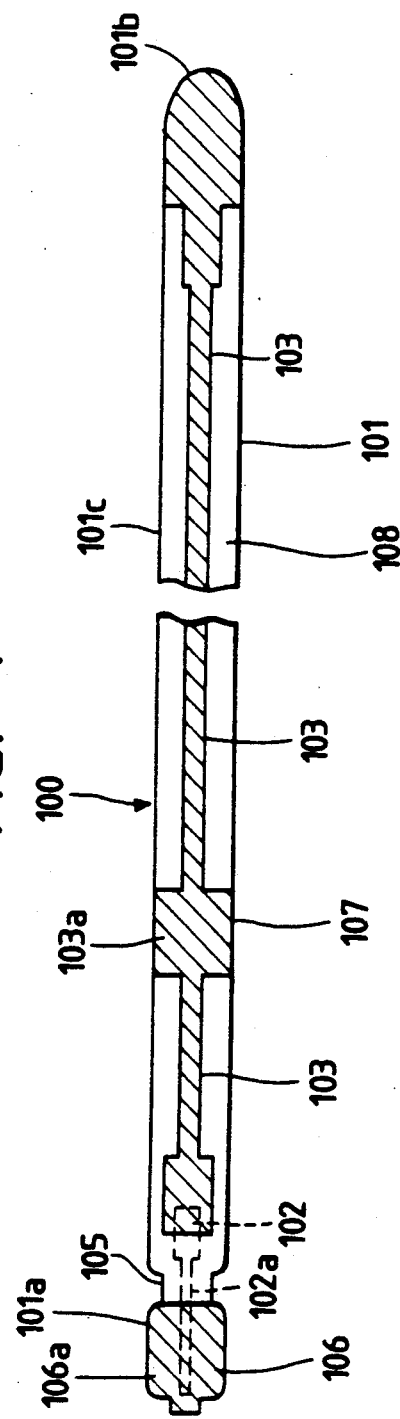

AUTOMOTIVE METER DEVICE HAVING SELF-ACTING LIGHT-EMITTING POINTER

BACKGROUND OF THE INVENTION

1. Field of the Invention

The present invention relates to generally to meter devices for motor vehicles such as speedometers, tachometers, etc., and more particularly to an automotive meter device having a spontaneous or self-acting light-emitting needle or pointer.

2. Description of the Prior Art:

Japanese Patent Laid-open Publication No. 1-277718 discloses a meter device including a spontaneous or self-acting light-emitting pointer which is composed of an electric discharge tube connected to a pointer boss fixed to a meter shaft of a pointer drive unit. The discharge tube has positive and negative electrodes to which an electric current is suppled through a pair of current supply terminals held in contact with the electrodes, through first and second hair springs, through fittings, and through lead wires. When energized, the discharge tube emits light so that the driver can readily observe the luminous pointer.

When assembling the known meter device, the current supply terminals are connected by soldering with the first and second hairsprings to electrically connect the two electrodes of the discharge tube with a source of electric power. However, such soldering must be carried out through a small central hole in a dial plate and hence requires a tedious and time-consuming operation which will considerably lower the assembling efficiency of the meter device.

SUMMARY OF THE INVENTION

With the foregoing difficulties of the prior art in view, it is an object of the present invention to provide an automotive meter device including structural features which make it possible to automatically complete an electric connection between opposite terminals of a self-acting light-emitting needle or pointer at the time when the pointer is assembled with a meter shaft.

According to a first aspect of this invention, there is provided a meter device for a motor vehicle, comprising: a pointer drive unit for rotating a meter shaft in response to an input signal; a self-acting light-emitting pointer fixedly mounted on the meter shaft for co-rotation therewith, the pointer including a light-emitting element having first and second electrodes, and first and second current supply members connected, at one end thereof, to the first and second electrodes, respectively, and having, at the opposite end, first and second connecting portions, respectively, extending in a direction substantially parallel to a longitudinal axis of the meter shaft; third and fourth current supply members having, at one end thereof, third and fourth connecting portions, respectively, extending in said direction, the third and fourth connecting portions being releasably engageable with the first and second connecting portions, respectively, to electrically connect the first and second current supply members and the third and fourth current supply members simultaneously when the self-acting light-emitting pointer is mounted on the meter shaft; and fifth and sixth current supply members connected, at one end thereof, to a power source and, at the opposite end thereof, to the opposite end of the third and fourth current supply members, respectively.

The third and fourth current supply members are connected, at the opposite end, to one end of first and second metallic spiral springs, respectively. The fifth and sixth current supply members are connected to the opposite end of the first and second spiral springs for supplying an electric current to the first and second spiral springs.

The light-emitting element may be an elongate hollow cylindrical discharge tube having first and second power-receiving portions disposed on an outer surface thereof and electrically connected with the first and second electrodes, respectively. Each of the first and second current supply members further has at its one end a resilient grip portions snap-fitted over corresponding one of the first and second power-supply portions.

The self-acting light-emitting pointer may include an elongate conductive lead frame, and a row of light-emitting diode tips disposed on the lead frame and molded with synthetic resin together with the lead frame, the light-emitting diode tips constituting said light-emitting element. The lead frame has first and second connecteor terminals connected with the first and second electrodes of the light-emitting element, respectively, and disposed on the outside of said pointer. Each of the first and second current supply members has at its one end a plug-in socket resiliently holding therein corresponding one of the first and second connector terminals.

According to a second aspect of this invention, there is provided a meter device for a motor vehicle, comprising: a pointer drive unit for rotating a meter shaft in response to an input signal, the meter shaft being made of an electrically conductive material; a self-acting light-emitting pointer having a tubular pointer shaft firmly fitted with the meter shaft sleeve for co-rotation therewith, the pointer including a light-emitting element having first and second electrodes, a first current supply member connected, at one end thereof, with the first electrode and having, at the opposite end thereof, a first connecting portion extending in a direction substantially parallel to a longitudinal axis of the pointer shaft, and a second current supply member connected, at one end thereof, with the second electrode and having a second connecting portion constituting the pointer shaft; a third current supply member having, at one end thereof, a third connecting portion extending in a direction substantially parallel to the meter shaft and connected, at the opposite end thereof, with one end of a first metallic spiral spring, the third connecting portion being releasably engageable with the first connecting portion to electrically connect the first and third current supply portions simultaneously when the pointer shaft is fitted over the meter shaft to electrically connect the second current supply member and the meter shaft; a second metallic spiral spring connected at one end with the meter shaft, the meter shaft constituting a fourth current supply member; and fifth and sixth current supply members connected to the opposite ends of the first and second spiral springs, respectively, for supply an electric current to the first and second spiral springs.

The above and other objects, features and advantages of the present invention will become more apparent from the following description when making reference to the detailed description and the accompanying sheets of drawings in which preferred structural embodiments incorporating the principles of the present invention are shown by way of illustrative example.

BRIEF DESCRIPTION OF THE DRAWINGS

FIG. 3 is a plan view, with parts cutaway for clarity, of an electric discharge tube of the pointer assembly;

FIG. 4 is a plan view showing the discharge tube before it is coated with a shading layer;

DETAILED DESCRIPTION OF THE PREFERRED EMBODIMENTS

Figure 21:
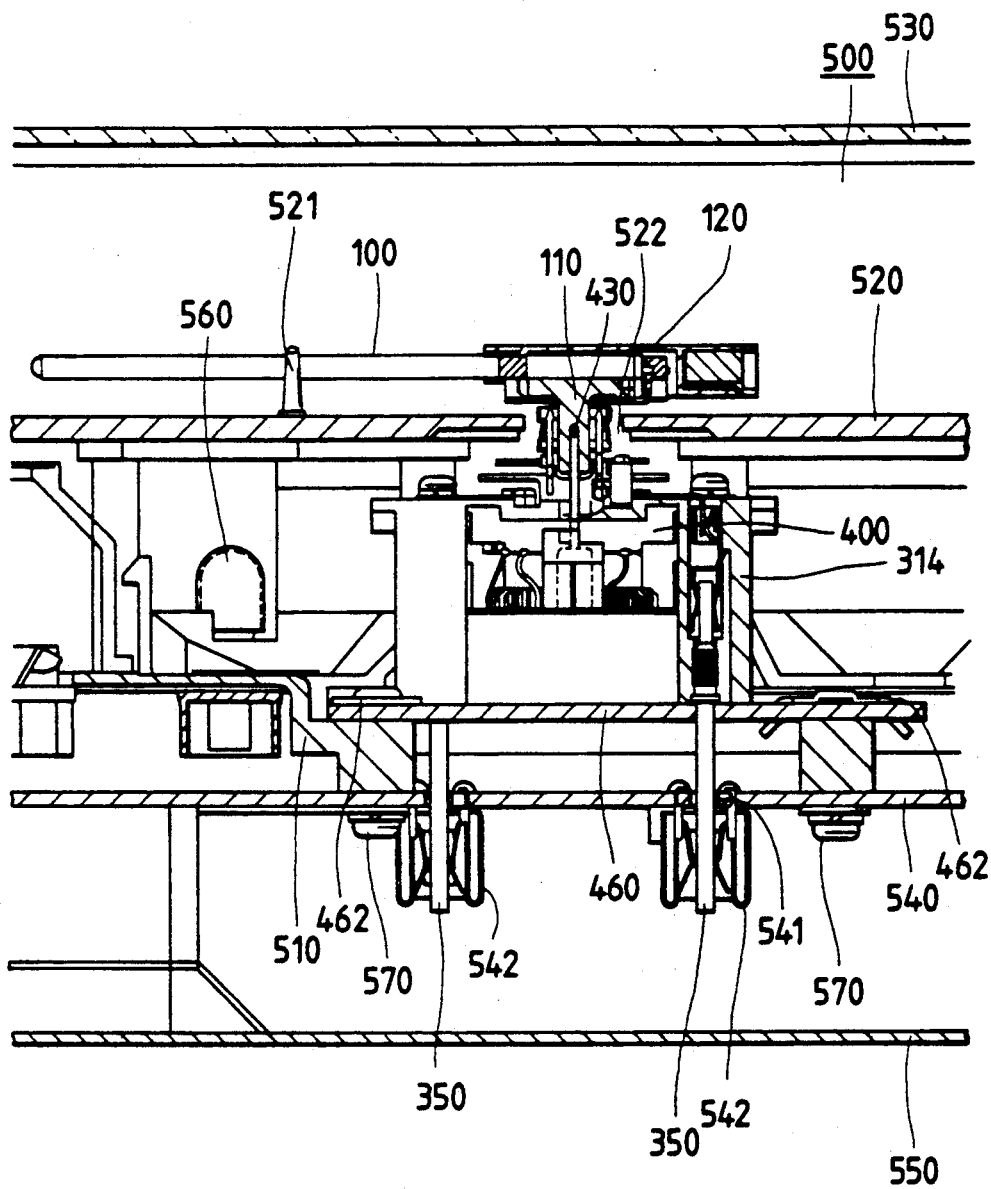
FIG. 21 is a cross-sectional view of the meter device as it is mounted in a meter case.

Referring now to the drawings, wherein like reference characters designate like or corresponding parts throughout the several views, there is shown in FIG. 21 a meter device for motor vehicles according to a first embodiment of this invention.

The meter device is mounted in a meter case 510 and includes a spontaneous or self-acting light-emitting needle or pointer assembly 1.

Figure 1:
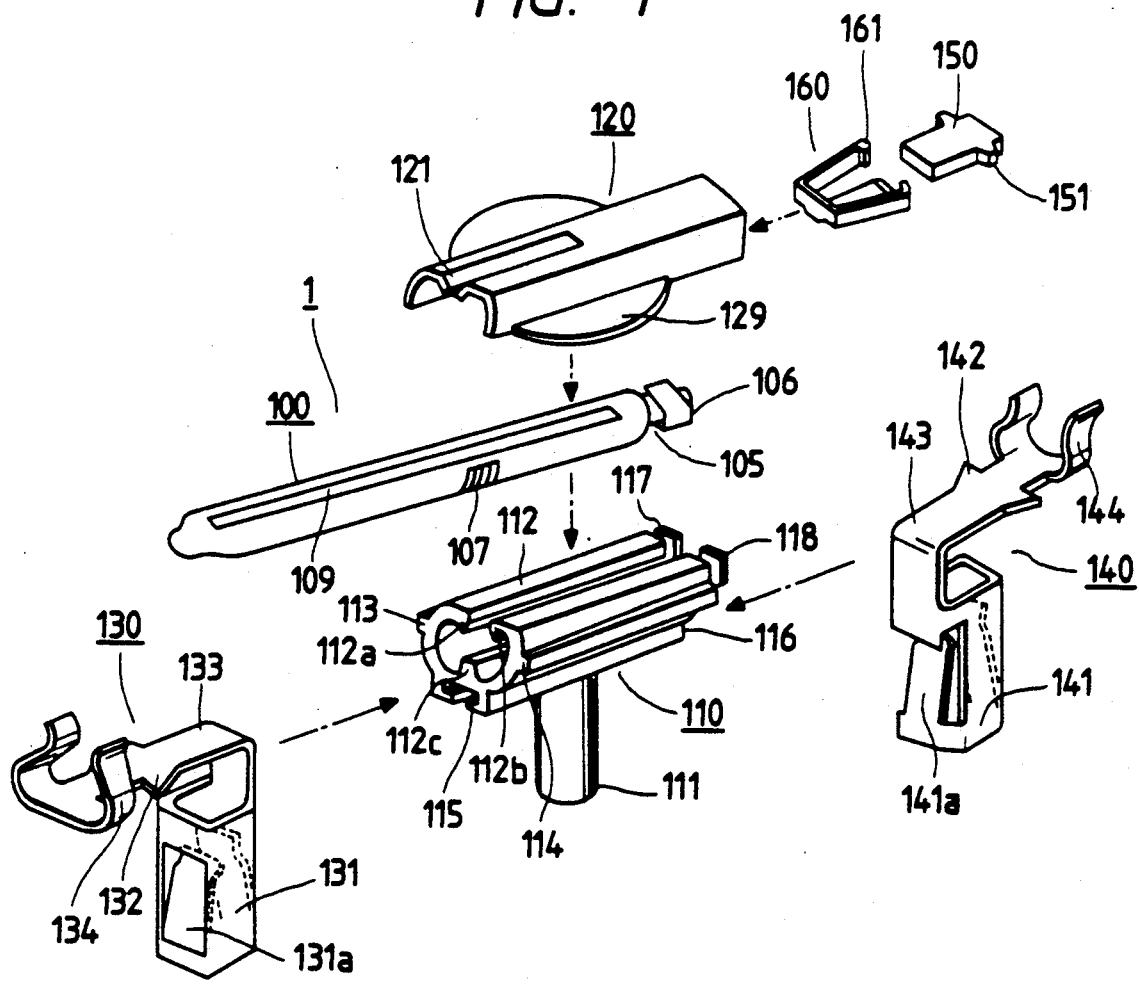
FIG. 1 is an exploded perspective view of a pointer assembly of a meter device according to a first embodiment of this invention.

The needle assembly 1 includes, as shown in FIG. 1, an electric discharge tube 100 constituting a self-acting light-emitting pointer. As shown in FIGS. 3 and 4, the discharge tube 100 comprises an elongate hollow bulb 101, an internal electrode 102 disposed in one end 101a (rear end adjacent to an axis of rotation of the pointer 100) of the bulb 101, and an external electrode 103 disposed on the outside surface of the bulb 101 and extending longitudinally of the bulb 101. The inside surface of the bulb 101 is coated with a fluorescent layer 104.

The bulb 101 is filled with an inert gas and has a dome-shaped or hemispherical front end 101b and a cylindrical intermediate portion 101c extending between the dome-shaped front end 101b and the rear end 101a. The rear end 101a of the bulb 101 is solid and composed of a restricted portion 105 contiguous to an end of the intermediate portion 101c and a pair of diametrically opposed, rectangular power-receiving portions 106. The rear and 101a has a bare wire 102a embedded centrally therein. The bare wire 102a is connected with the internal electrode 102 and has a bent end forced against the surface of the power-receiving portions 106. The power-receiving portions 106a are coated with conductive layers 106 of a silver paste and hence they are electrically connected with the bare wire 102a. The external electrode 103 has a power-receiving portion 107 formed of a strip of electrically conductive layer 103 of silver paste coated circumferentially over the outer surface of the bulb 101 at a portion disposed near the restricted portion 105.

The outside surface of the bulb 101 is coated with a shading layer 108. The shading layer 108 has a slit 109 extending longitudinally of the bulb 101 and having a width of 1 mm and a length of 55 mm, for example. The slit 109 is permeable to light and hence provides a light-emitting surface. The light-permeable slit 109 has a rear end terminating short of the internal electrode 102 and spaced from the same by 2 mm, for example.

The external electrode 103 is an elongate strip of paste of an electrically conductive material, such as a carbon phenol paste or a silver paste, which is coated longitudinally over the outside surface of the bulb 101. As shown in FIG. 4, the width of the external electrode 103 is enlarged at opposite end portions which are remote from the power-receiving portion 107. With the enlarged or widened ends of the external electrode 108, electrons which emitted from the internal electrode 102 toward the external electrode 103 are distributed uniformly over the entire surface of the external electrode 103. The discharge tube 100 can, therefore, emit light at a uniform luminous intensity over the entire length of the discharge tube 100.

The discharge tube 100 is of an elongate hollow cylindrical bar having a weight of 0.8 g and an outside diameter of 2.4 mm, for example, and contains a gaseous mixture of xenon and neon filled at 90 Torr. When energized with a high frequency electric power, the discharge tube 100 produces a glow discharge formed between the internal electrode 102 and the external electrode 103 which in turn activates the fluorescent layer to give off visible light of high brightness such as 2000 cd/m$^2$.

As shown in FIG. 1, a pointer boss 110 constitutes a pointer retainer and is molded of a polyether sulfonic resin. The pointer boss 110 includes a tubular shaft or leg 111 adapted to be fitted over a meter shaft 430 (FIG. 20), and a resilient bulb retaining portion 112 extending perpendicular to the leg 111 for retaining a rear end portion of the discharge tube 100 through a snap-fit engagement.

Figure 5:
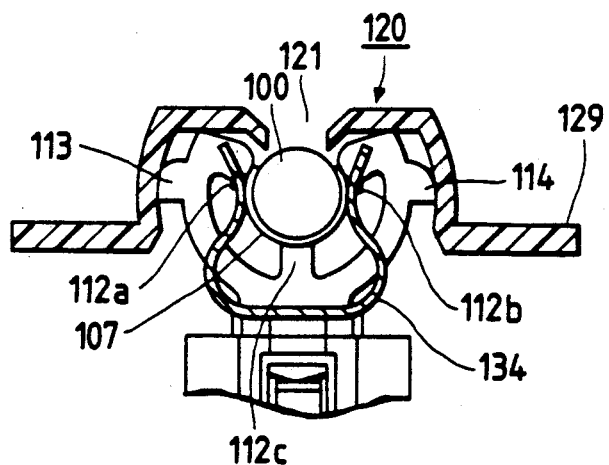
FIG. 5 is a cross-sectional view taken along line V—V of FIG. 2.
Figure 6:
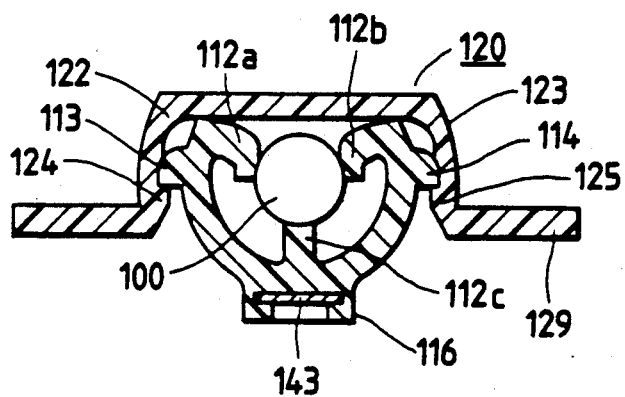
FIG. 6 is a cross-sectional view taken along line VI—VI of FIG. 2.
Figure 7:
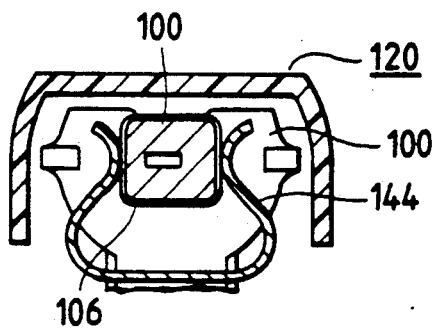
FIG. 7 is a cross-sectional view taken along line VII—VII of FIG. 2.

As also shown in FIGS. 5 through 7, the bulb retaining portion 112 is an elongate bar of a generally C-shape in cross section and includes three elongate projections or ridges 112a, 112b, 112c projecting from an inside surface of the bulb retaining portion 112 and extending longitudinally along opposite longitudinal edges and a central portion of the bulb retaining portion 112, respectively. The ridges 112a, 112b, 112c are circumferentially spaced at equal angular intervals of about 120 degrees and jointly define portions of a circle having a diameter slightly smaller than the outside diameter of the discharge tube 100.

The bulb retaining portion 112 further includes elongate projections or ridges 113, 114 projecting from the outside surface of the bulb retaining portion 112 and extending alongside the opposite longitudinal edges of the bulb retaining portion 112 for locking engagement with a pointer boss cover 120. The bulb retaining portion 112 has a pair of aligned longitudinal grooves 115, 116 of an inverted T-shaped cross section extending from opposite ends thereof toward the leg ill for retaining first and second current supply members or terminals 130, 140, respectively. A support wall 118 is connected to the rear end of the bulb retaining portion 112 and has an U-shaped cutout recess 117.

The discharge tube 100 is snap-fit with the bulb retaining portion 112 and firmly gripped therein by means of the ridges 112a, 112b, 112c under the resiliency of the bulb retaining portion 112. In this instance, resilient deformation of the bulb retaining portion takes place smoothly because the support wall 118 is connected only with a bottom wall of the bulb retaining portion 112 and separated from opposite side walls of the bulb retaining portion 112. The restricted portion 105 of the discharge tube 100 is fitted with the cutout recess 117 in the support wall 118 so that the discharge tube 100 is positioned in axial and circumferential directions.

The pointer boss cover 120 is generally flat in profile and has a longitudinal slit 121 extending from a front end toward the rear end of pointer boss cover 120. The pointer boss cover 120 further has a pair of opposed locking prongs 124, 125 lockingly engageable with the ridges 113, 114 of the bulb retaining portion 112 when the pointer boss cover 120 is snapper with the pointer boss cover 120. The pointer cover 120 has a substantially box-like retaining recess 127 (FIG. 2) opening rearwardly, a hole 128 communicating with the retaining recess 127 adjacent to an open end thereof, and a pair of opposite semicircular wings 129 projecting laterally from a body of the pointer boss cover 120.

The first and second current supply terminals 130, 140 include socket-like first and second connecting portions 131, 141 engageable with the outside surface of the leg 111 of the pointer boss 110, arm plates 133, 143 extending radially outwardly from one end of the connecting portions 131, 141 and each having a pair of laterally projecting guide wings 132, 142, and grip portions 134, 144 integral with the front end of the arm plates 133, 143 and having a substantially inverted $\Omega$-shape for resiliently holding the power-receiving portions 106, 107 of the discharge tube 100.

The first and second connecting portions 131, 141 each has a pair of opposed resilient grip arms 131a, 141a inclined toward each other to provide a reliable electric connection between the connecting portions 131, 141 and third and fourth connecting portions (described later), respectively.

The current supply terminals 130, 140 are attached to the bulb retainer portion 112 by forcing the guide wings 132, 142 of the arm plates 133, 143 into the T-shaped grooves 115, 116 until the connecting portions 131, 141 engage the leg 111.

A balance weight 150 has a pair of lateral locking projections 151. A weight holder 160 is constructed to hold the balance weight 150 and includes a pair of retaining arms 161 engageable with the locking projections 151, a locking portion 162 lockingly engageable with the hole 128 of the retaining recess 127 of the cover 120, and a resilient flap 163 for urging the balance weight 150 against the inside surface of the cover 120 to retain the balance weight 150.

Figure 2:
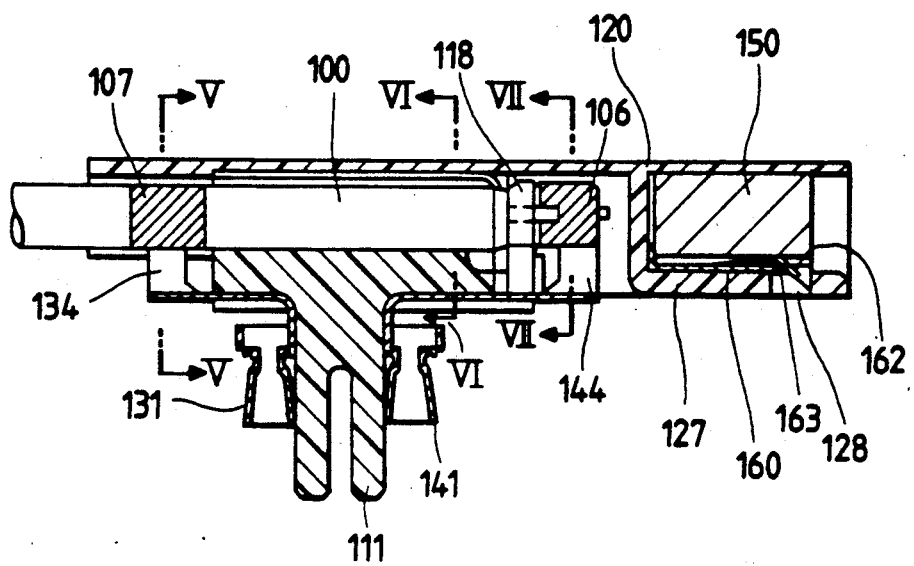
FIG. 2 is a cross-sectional view showing a main portion of the pointer assembly.

The balance weight 150 is forced between the retaining arms 161 of the weight holder 160 until the locking projections 151 are snapped with the retaining arms 161. Thus, the balance weight 150 is retained on the weight holder 160. Then the weight holder 160 is forced into the weight retaining recess 127 until the locking portion 162 snaps into the hole 128. The balance weight 150 is thus retained in the weight retaining recess 127. In this instance, the balance weight 150 is urged against the inside surface of the cover 120 by means of the resilient flat 163, as shown in FIG. 2.

Figure 8:
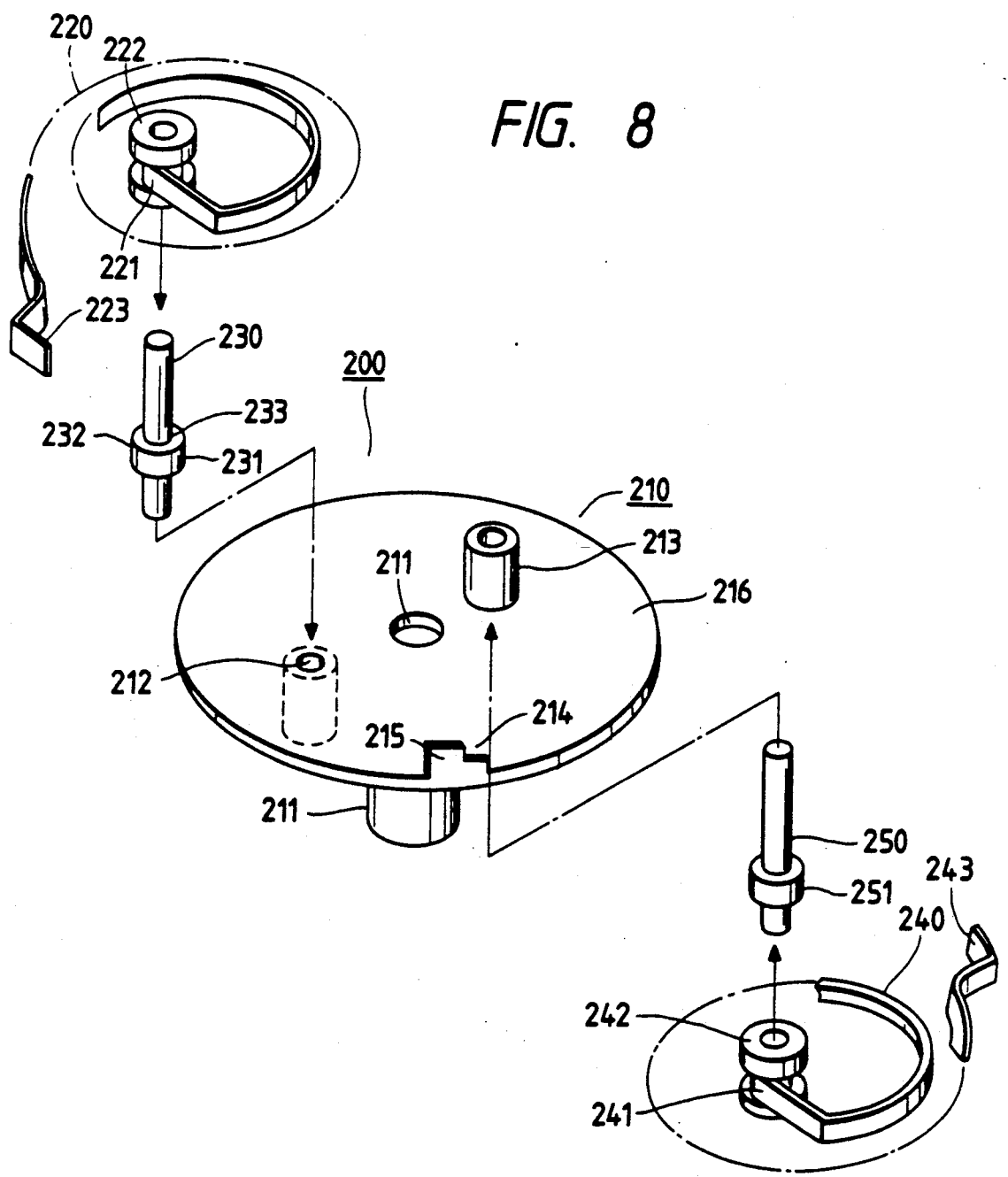
FIG. 8 is an exploded perspective view of an insulator assembly of the meter device.
Figure 9:
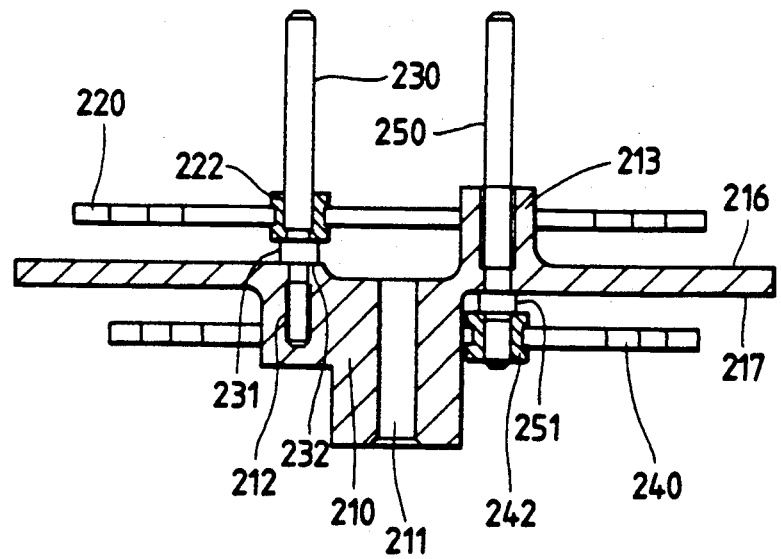
FIG. 9 is a cross-sectional view of the insulator assembly.
Figure 10:
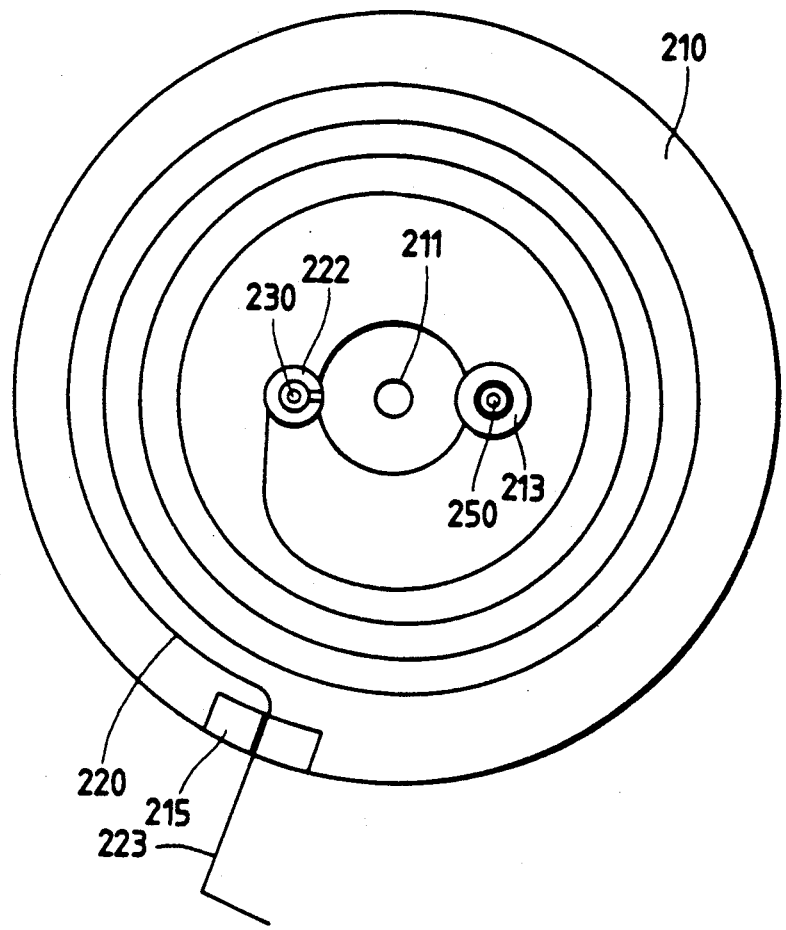
FIG. 10 is a plan view of the insulator assembly.

An insulator assembly 200 of the meter device will be described below with reference to FIGS. 8 through 10.

The insulator assembly 200 includes a circular turn plate 210 having a central hole 211 for receiving therein the meter shaft 430 (FIG. 20), a circular recess 212 formed on an upper surface of the turn plate 210 adjacent to the central hole 211, and a hollow cylindrical projection 213 disposed on the upper surface of the turn plate 210 in symmetric relation to the recess 212 about the center of the central hole 211. The turn plate 210 further has a stopper 215 disposed on the outer peripheral edge of the turn plate 210 for engagement with a portion of a fixer plate assembly 300 to limit rotation of the turn plate 210 and hence the pointer within a predetermined range. The stopper 215 has a step 214 facing toward a direction which is opposite to the direction of rotation of the turn plate 210.

A first hairspring 220 made of metal and having a spiral shape is joined at its inner end 221 with a metallic hollow cylindrical member 222 by means of soldering or clinching. The spiral hairspring 220 has a plurality of turns.

A metallic first terminal pin 230 which constitutes a third current supply member has an annular flange 231 adjacent to a lower end thereof. The first terminal pin 230 is press-fitted into the recess 212 from the lower end thereof until a lower surface 232 of the flange 231 abuts against the upper surface 216 of the turn plate 210.

The hollow cylindrical member 222 is press-fitted over the first terminal pin 230 until it abuts against the upper surface 233 of the flange 231. Thus the first hairspring 220 and the first terminal pin 230 (third current supply member) are electrically connected together. The outer end 323 of the first hairspring 230 projects radially outwardly from the outer periphery of the spiral hairspring 230 and is bent into an L shape, as shown in FIG. 10.

Similarly, a second spiral hairspring 240 of metal is joined at its inner end 241 with a metallic hollow cylindrical member 242 by means of soldering or clinching. The spiral hairspring 240 has a plurality of turns.

A metallic second terminal pin 250 which constitutes a fourth current supply member has an annular flange 251 adjacent to a lower end thereof. The first terminal pin 250 is press-fitted into the hollow cylindrical projection 213 from an upper end thereof until an upper surface of the flange 251 abuts against the under surface 217 (FIG. 9) of the turn plate 210. The second terminal pin 250 projecting upwardly through the hollow cylindrical projection 213 has a same height as the first terminal pin 230.

The hollow cylindrical member 242 is press-fitted over the second terminal pin 250 until it abuts against the lower surface of the flange 251. Thus, the second hair-spring 240 and the second terminal pin 250 (fourth current supply member) are electrically connected with each other. The outer end 343 of the second hairspring 240 projects radially outwardly from the outer periphery of the second hairspring 240 and is bent into an L shape.

A fixer plate assembly 300 of the meter device will be described below with reference to FIGS. 11 through 16.

The fixer plate assembly 300 includes a fixer plate 310 molded of synthetic resin and having a substantially rectangular plate portion 311. The plate portion 311 has a central hole 312 for the passage therethrough of the meter shaft 430, a stepped circular recess 313 extending around the central hole 312 for receiving therein the second hair-spring 240, first and second support portions 314, 315 extending in a direction parallel to the axis of the central hole 312 and having rectangular through-holes 314a (only one shown in FIG. 13), respectively, and a plurality of threaded holes 316 for the attachment of the fixer plate 310.

Figure 11:
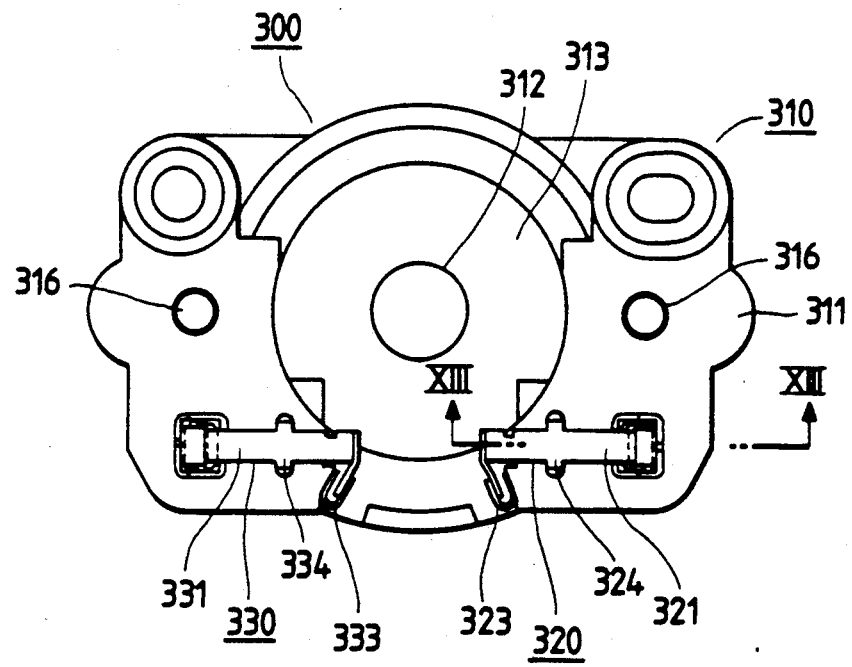
FIG. 11 is a plan view of a fixer plate assembly of the matter device.
Figure 12:
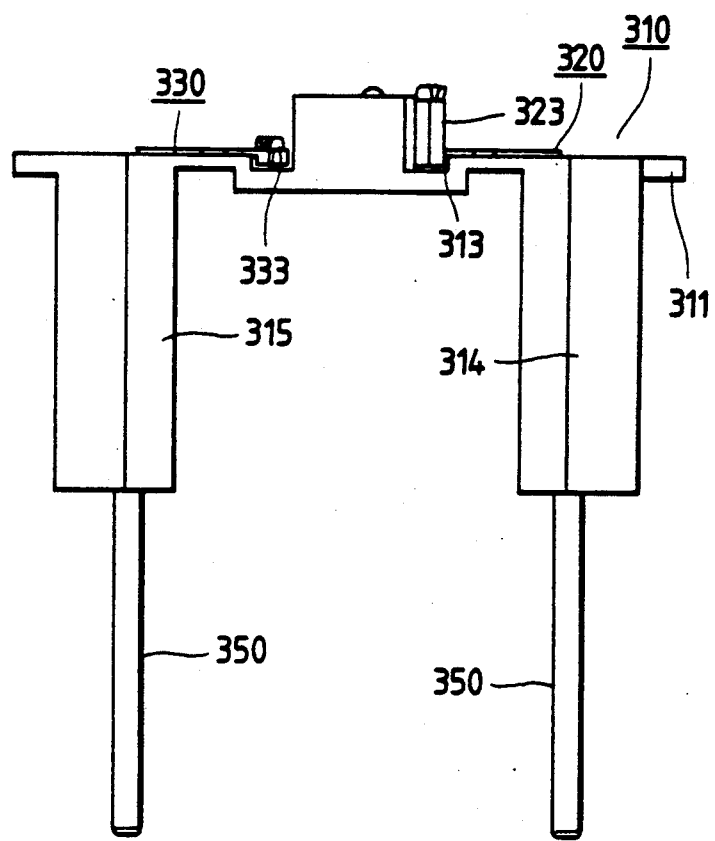
FIG. 12 is a front elevational view of the fixer plate assembly.
Figure 13:
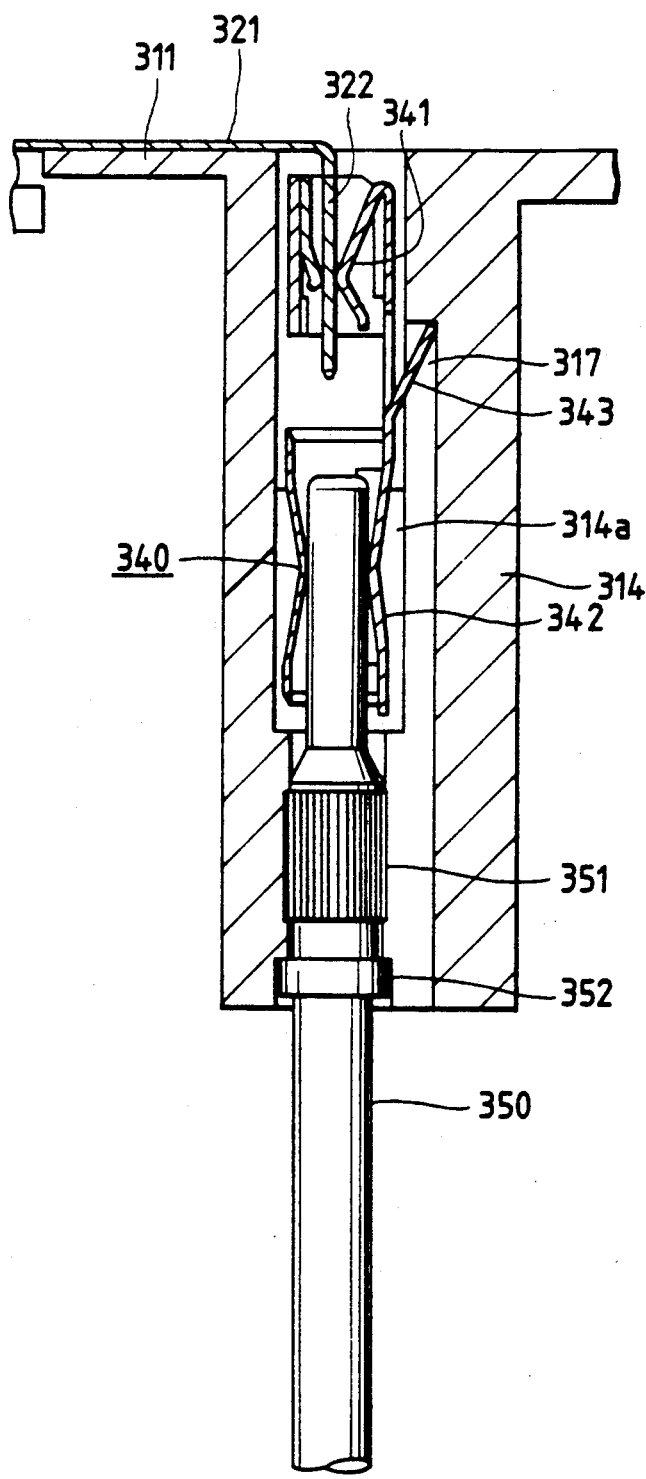
FIG. 13 is an enlarged cross-sectional view taken along line XIII—XIII of FIG. 10.
Figure 14:
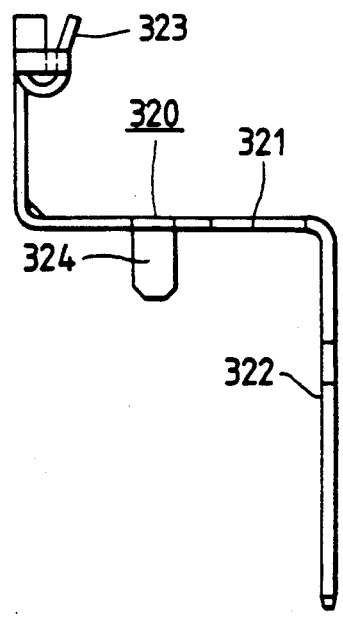
FIG. 14 is a front elevational view of a terminal of the fixer plate assembly.
Figure 15:
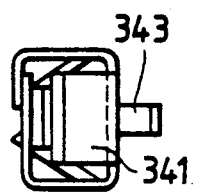
FIG. 15 is a plan view of another terminal of the fixer plate assembly.

Third and fourth terminals 320, 330 which constitute fifth and sixth current supply members include, as shown in FIGS. 11 and 14, flat planar portions 321, 331 lying over an upper surface of the fixer plate 310, legs 322 (only one shown in FIGS. 13 and 14) extending from one end of the planar portions 321, 331 in a direction parallel to the axis of the central hole 312 and receivable in the through-holes 314a of the support portions 314, 315, and attachment portions 323, 333 extending from the opposite end of the planar portions 321, 331 away from the legs 322 and having a V-shaped end. Each of the terminals 320, 330 further has a pair of locking lugs 324, 334 for fastening the terminal 320, 330 to the fixer plate 310. The locking lugs 324, 334 are disposed on opposite edges of a central portion of the corresponding planar portion 321, 331 and bent at the right angle to the planar portion 321, 331. As shown in FIG. 12, the attachment portion 323 of the third terminal 320 is disposed at a higher level than the attachment portion 333 of the fourth terminal 330 for a purpose described below.

Figure 16:
FIG. 16 is a bottom view of the terminal shown in FIG. 15.

A fifth terminal 340 is received in each of the through-holes 314a of the respective support portions 314, 315. The terminal 340 has a socket-like first retaining portion 341 for resiliently holding therein the leg 322, 332 of the corresponding one of the third and fourth terminals 320, 330 to make an electric connection therebetween. The terminal 340 further has, at its lower end, a centrally restricted socket-like second retaining portion 342 for resiliently holding therein a terminal pin 350 described later on. The second retaining portion 342 has a substantially triangular shape in cross section, as shown in FIG. 16. The second retaining portion 342 includes a resilient locking prong 343 inclined outwardly away from a longitudinal axis of the retaining portion 342 and engageable with a stepped locking recess 317 of the corresponding through-hole 314 to lock the terminal 340 in the through-hole 314a of the corresponding one of the support portions 314, 315.

Terminal pins 350 each have a knurled portion 351 and a annular positioning flange 352, as shown in FIG. 13. The knurled portion 351 of each terminal pin 350 is pressfitted into the through-hole 314a of the corresponding support portion 314, 315 until the positioning flange 352 abuts against an end of the support portion 314, 315 whereby the terminal pins 350 are attached to the fixer plate 310, as shown in FIG. 12. In this instance, the front end of each terminal pin 350 is fitted into the second retaining portion 342 of the fifth terminal 340 to make an electric connection therebetween.

Thus, the pair of terminal pins 350 are electrically connected to the third and fourth terminals 320, 330 via the fifth terminals 340.

Figure 17:
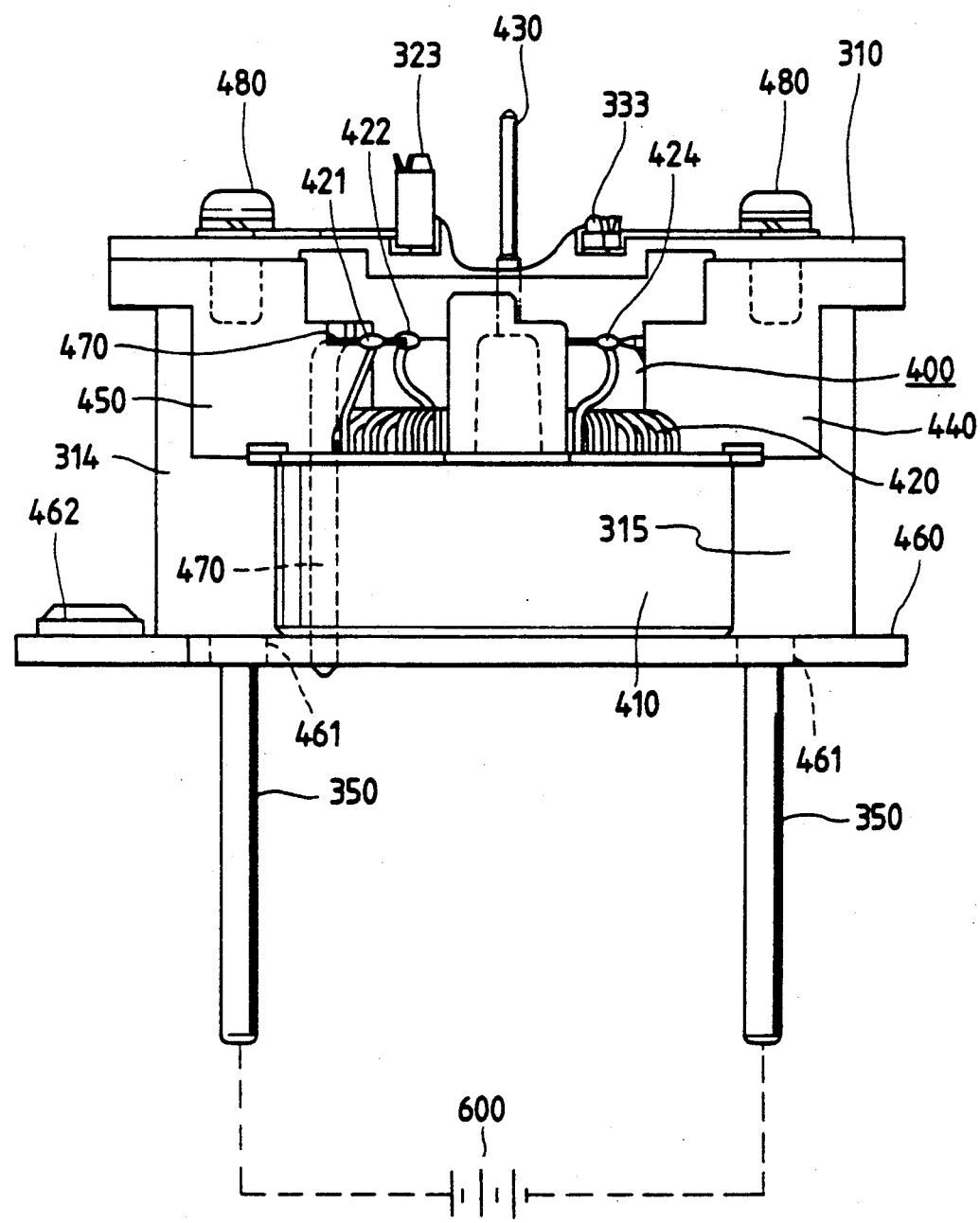
FIG. 17 is a front elevational view showing a pointer drive unit and assembled with the fixer plate assembly.

A pointer drive unit 400 of the meter device will be described below in brief with reference to FIG. 17.

The pointer drive unit 400 comprises a cup-shaped case 410 of metal, a cross coil 420 disposed in the case 410, a meter shaft 430 rotatably driven by the cross coil 420 when an electric current flows through the cross coil 420, and a pair of support columns 440, 450 molded of synthetic resin.

The pointer drive unit 400 is fixedly mounted on a circuit board 460 and driven by the circuit board 460. Ends 421–424 of the cross coil 420 are connected to terminals 470 (only one shown) which extend through the support columns 440, 450 and are electrically connected to the circuit board 460.

The circuit board 460, as shown in FIG. 12, has a plurality of circuit components such as resistors and is operative to supply an electric current to the cross coil 420 for angularly moving or turning the meter shaft 430 through a predetermined angular range in response to an external signal inputted to the circuit board 460.

FIG. 21 shows the pointer drive unit 400, the fixer plate assembly 300, the insulator assembly 200 and the pointer assembly 1 that are disposed in a meter housing 500.

The meter housing 500 includes a meter case 510 constituting a frame, a dial plate 520 disposed above the meter case 510 and having characters, scales, etc., and a meter cover of transparent or translucent glass disposed above the dial plate 520 to cover the pointer assembly 1 and the dial plate 520. A meter sub-plate 540 serving as a circuit board is disposed on the underside of the meter case 510 and covered by a protective plate 550 disposed below the meter sub-plate 540. An illuminating lamp 560 is disposed below the dial plate 520 for lighting up the dial plate 520.

The meter device of the foregoing construction is assembled in the manner described below.

After the pointer drive unit 400 is fixed to the circuit board 460, the fixer plate assembly 300 is assembled with the pointer drive unit 400. In this instance, the fixer plate 310 is placed on the support columns 440, 450 and then secured thereto by means of a plurality of screws 480 which are threaded into the support columns 440, 450 through threaded holes 316 in the fixer plate 310. The fixer plate 310 is thus fixedly secured relative to the pointer drive unit 400. The terminal pins 350 extend downwardly through holes 461 of the circuit board 460, while the meter shaft 430 extends upwardly through the central hole 312 of the fixer plate 310.

Thereafter, the central hole 211 of the turn plate 210 is fitted around the meter shaft 430. In this instance, the second hairspring 240 is disposed between the stepped circular recess 313 and the turn plate 210.

Figure 19:
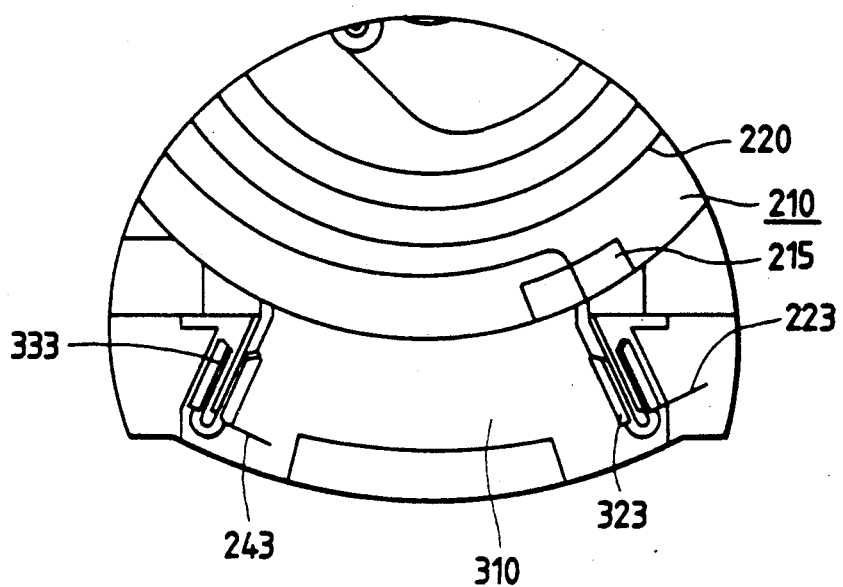
FIG. 19 is an enlarged plan view showing a portion of FIG. 18.

Subsequently, as shown in FIG. 19, the outer end 223 of the first hairspring 220 is received in the V-shaped front end of the attachment portion 323 of the third terminal 320. The V-shaped front end of the attachment portion 328 is compressed to clinch the outer end 223, thereby electrically connecting the first hairspring 220 and the third terminal 320.

Likewise, the outer end 243 of the second hairspring 240 is received in and then clinched with the V-shaped front end of the attachment portion 333 of the fourth terminal 330 whereby the second hairspring 240 is electrically connected with the fourth terminal 330.

Figure 18:
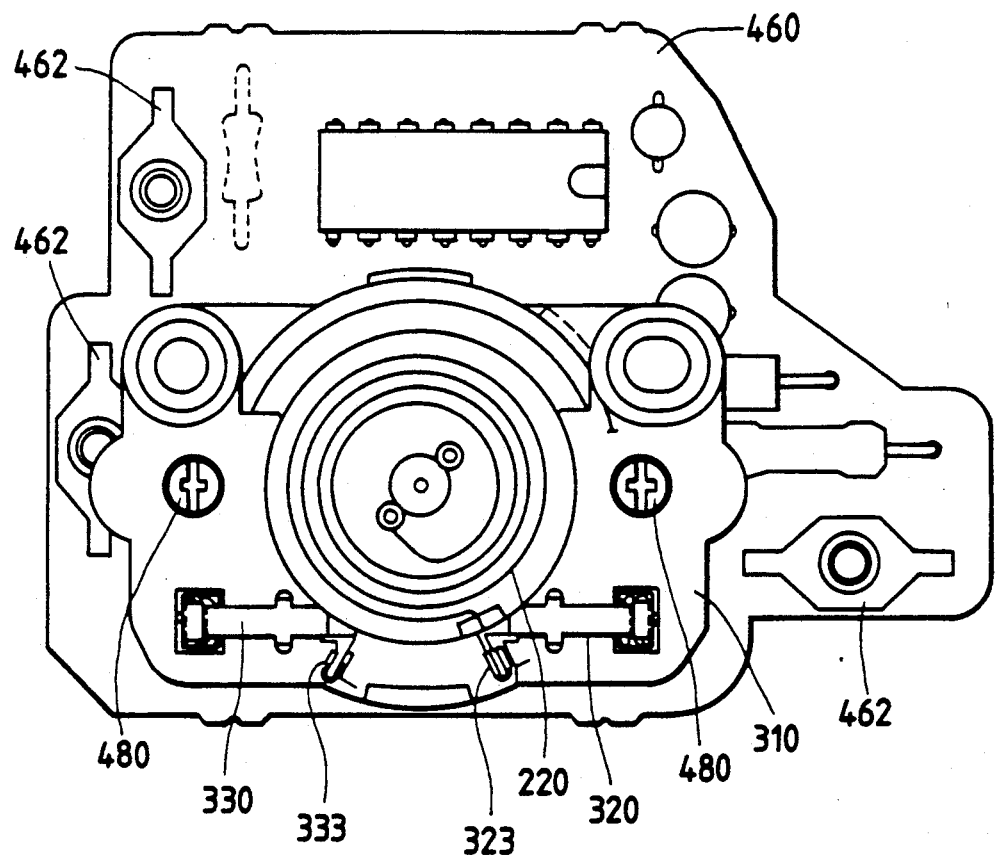
FIG. 18 is a plan view showing the insulator assembly and the fixer plate assembly that are assembled with the pointer drive unit.

Thus, the pointer drive unit 400, the fixer plate assembly 300, and insulator assembly 200 are assembled together, as shown in FIG. 18.

Figure 20:
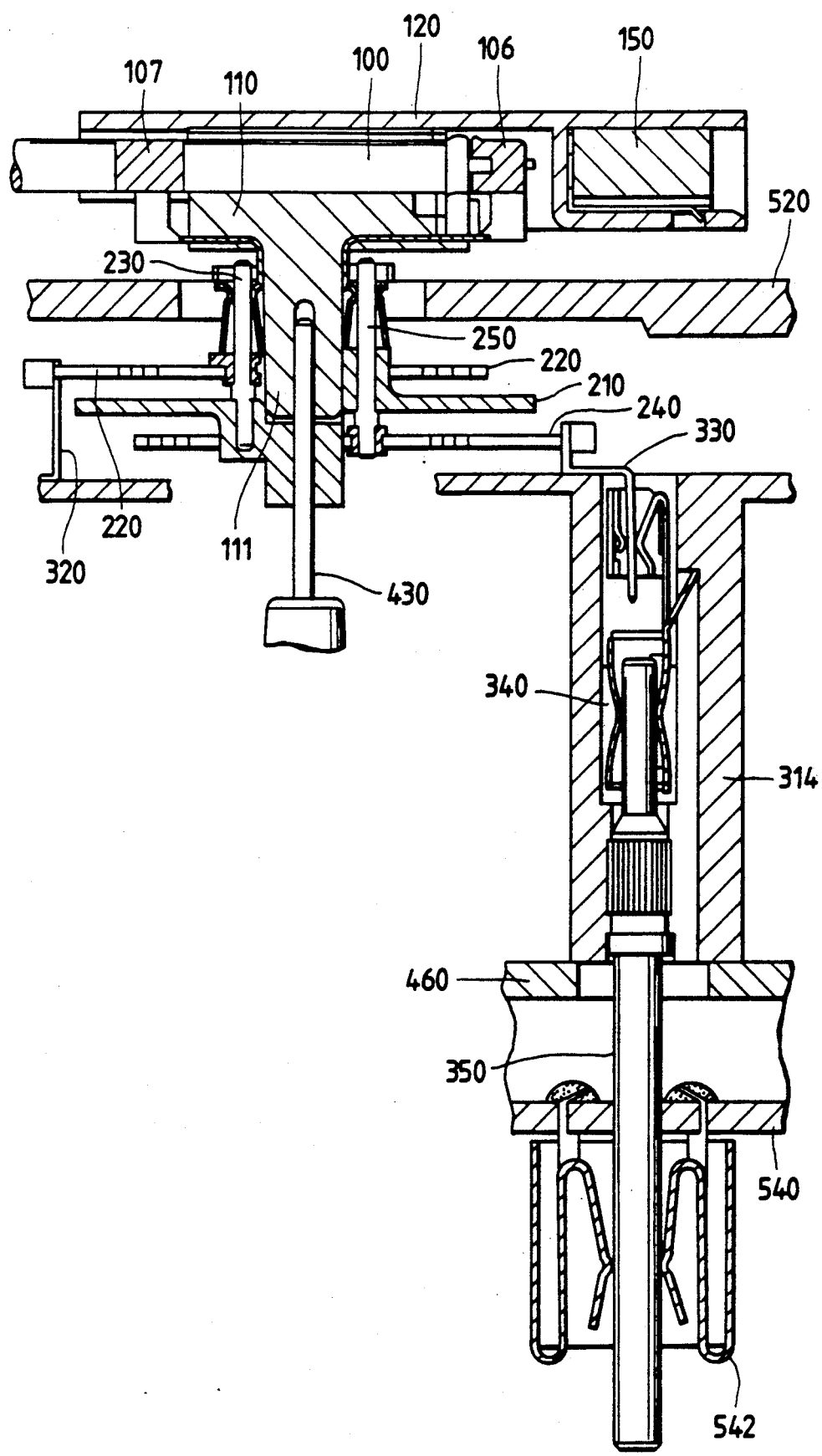
FIG. 20 is a cross-sectional view showing a main portion of an arrangement for supply an electric current to the discharge tube.

Then, the dial plate 520 is attached and, subsequently, the pointer assembly 1 is assembled with the meter shaft 430 of the pointer drive unit 400. In this instance, as shown in FIG. 20, the tubular leg 111 of the pointer boss 110 is press-fitted over the meter shaft 430. During that time, the resilient grip arms 131a of the first current supply terminal 130 resiliently fit over the first terminal pin 230 (third current supply member) of the insulator assembly 200, while the resilient grip arms 141a of the second current supply terminal 140 resiliently fit over the second terminal pin 250 (fourth current supply member) of the insulator assembly 200.

As obvious from FIG. 20, an electric current supplied from a power source such as a battery 600 (FIG. 17) is delivered to the power-receiving portions 106, 107 of the discharge tube 100 successively through the meter sub-plate 540, the socket connectors 542, the terminal pins 350, fifth terminals 340, the third and fourth terminals 320, 330, the first and second hairsprings 220, 240, the first and second terminal pins 230, 250 serving as the third and fourth current supply members), and the first and second current supply terminals 130, 140. The discharge tube 100 thus energized emits light.

Then, the circuit board 460 is disposed in the meter case 510 and subsequently it is secured screws 570 to the meter case 510 together with the meter sub-plate 540, as shown in FIG. 21.

The screws 570 are threaded with terminals 462 electrically connected to the circuit board 460 so that the electric current flows from the meter sub-plate 540 through the screws 570 to the circuit board 460. Obviously, the electric current is supplied to the screws 570 through a circuit printed on the meter sub-plate 540.

When the circuit board 460 is attached to the meter case 510, terminal pins 350 fixed to the fixer plate 310 extend through the holes 541 of the meter sub-plate 540 and fitted into the socket connectors 542. The socket connectors 542 are soldered to the circuit on the meter sub-plate 540.

As described above, the first and second current supply members or terminals 130, 140 are automatically connected with the first and second terminal pins 230, 250 (third and fourth current supply members), respectively, at the time when the tubular leg or shaft 111 of the pointer boss 110 is press-fitted over the meter shaft 430.

Furthermore, the first and second hairsprings 220, 240 are connected with the power source 600 through an electric circuit which is completed through the fifth terminals 340 and the third and fourth terminals 320, 330 when the terminal pins 350 are inserted into the socket connectors 542 on the meter sub-plate 540.

Since the direction of assembling of the fixer plate assembly 300 relative to the pointer drive unit 400 (i.e., the direction of insertion of the terminals) is the same as the direction of assembling of the pointer assembly relative to the pointer drive unit 400 (i.e., the direction of fitting of the leg 11 of the pointer boss 111 over the meter shaft 400), the fixer plate assembly 300 and the pointer assembly 1 can be easily assembled with the pointer drive unit 400 without the necessity of a tedious positional adjustment. The meter device of this invention can, therefore, be assembled efficiently with utmost ease.

Figure 22:
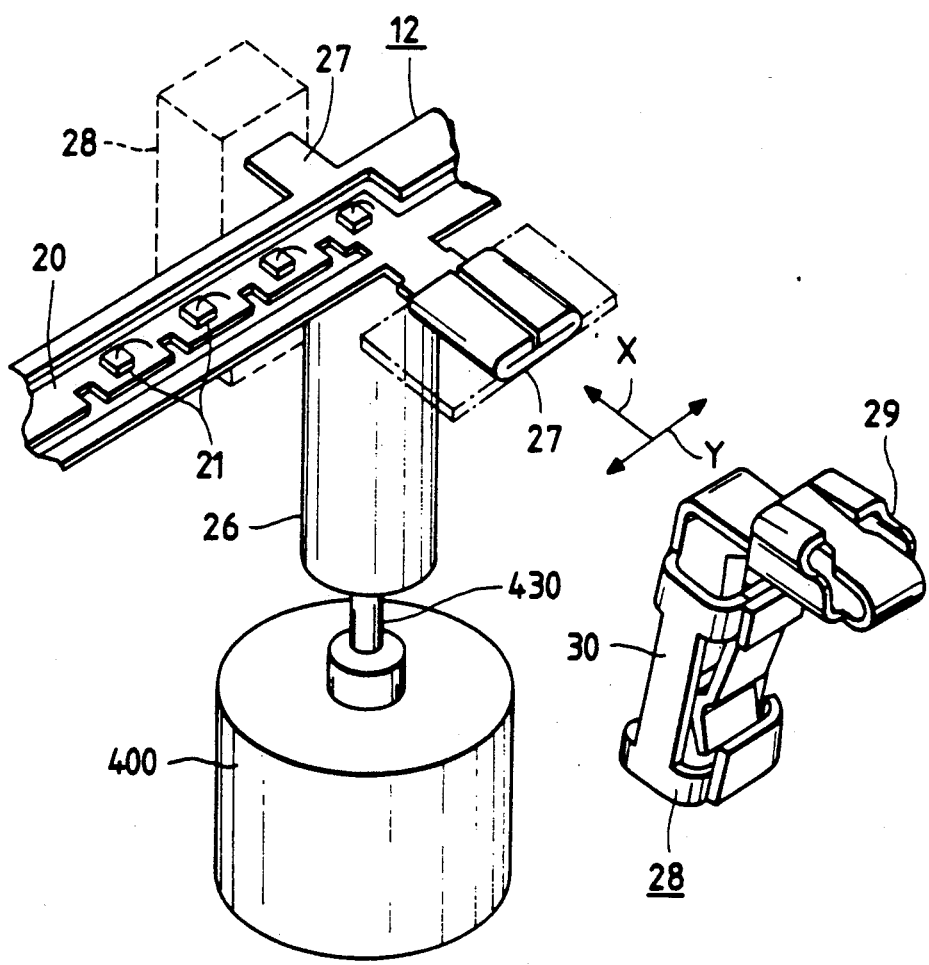
FIG. 22 is a schematic perspective view, with parts omitted for clarity, of a meter device according to a second embodiment of this invention.

FIG. 22 shows a modified meter device which is similar to the meter device of the foregoing embodiment but differs therefrom in the construction of a self-active light-emitting pointer assembly and also in the construction of first and second current supply members. Due to the structural similarity, those components which are similar to the components of the foregoing embodiment are designated by the corresponding reference characters and hence a description is no longer needed.

The pointer assembly 12 of the modified meter device includes a self-active light-emitting element composed of a row of light-emitting diode tips 21 (hereinafter referred to as "LED elements") disposed on an elongate lead frame 20. The lead frame 20 is an elongate strip of phosphor bronze having a thickness of 0.2 mm, for example. The upper surface (bonding surface) of the lead frame 20 is entirely plated with Ag (silver), while the under surface is entirely plated with Sn (tin). The upper surface may be plated with Au (gold). The lead frame 20 thus plated is particularly suitable for the purpose of wiring and bonding of the LED elements 21 relative to the lead frame 20.

Figure 24:
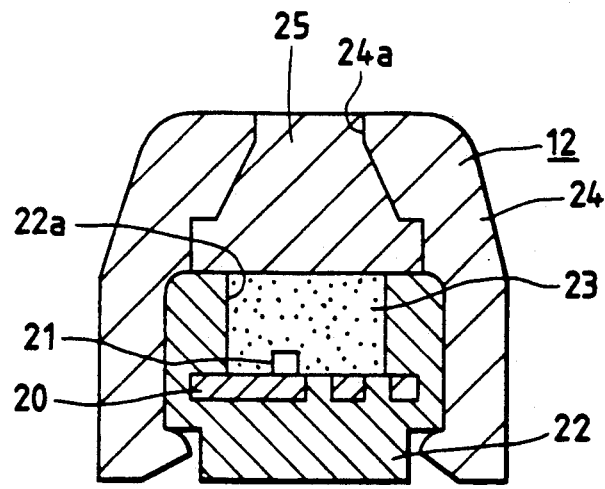
FIG. 24 is a transverse cross-sectional view of a pointer of the meter device shown in FIG. 22.

The LED elements 21 are disposed on the upper surface of the lead frame 20 along a length thereof and bonded to the upper surface. As shown in FIG. 24, the lead frame 20 is integrally molded with a lead house 22 except the LED elements 21. The lead house 22 is molded of white polycarbonate and has a longitudinal groove 22a opening upwardly so that the LED elements 21 and a central portion of the upper surface of the lead frame 20 are not covered with the lead house 22. The groove 22a of the lead house 22 is filled with a silicone resin 23. The lead house 22 is retained in a pointer case 24 molded of black polycarbonate. The pointer case 24 has a longitudinal groove or slit 24a through which light is emitted. The slit 24a is fitted with a lens 25 to form a light-emitting surface.

Figure 25:
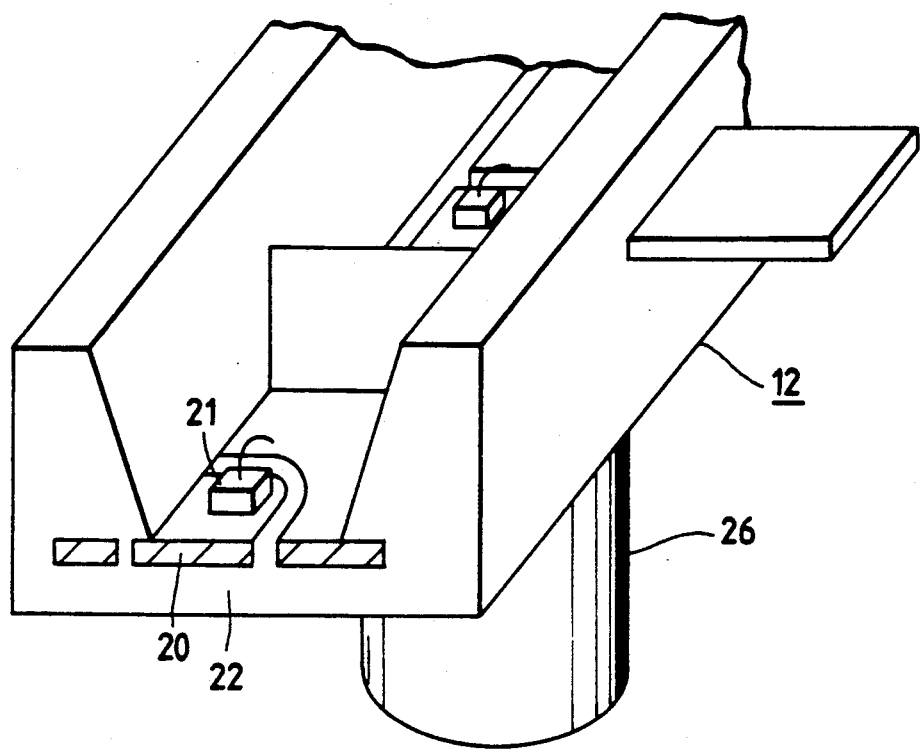
FIG. 25 is a fragmentary perspective view of the pointer with parts omitted for clarity.

The pointer assembly 12 includes a tubular pointer shaft or boss 26 adapted to be fitted over a meter shaft 430 (FIG. 22) of a pointer drive unit 400. As shown in FIG. 25, the boss 26 is integrally formed with the lead house 22 when the lead frame 20 is molded with the lead house 22.

The lead frame 20 includes, as shown in FIG. 22, a pair of connector terminals 27, 27 projecting from opposite longitudinal edges of the lead frame 20 in the transverse direction of the lead frame 20. The connector terminals 27, 27 are disposed in symmetric relation to one another about the axis of rotation the boss 26. The connector terminals 27 project from the lead house 22 and the pointer case 24 and the front end of each connector terminal 27 is folded on itself.

Figure 26:
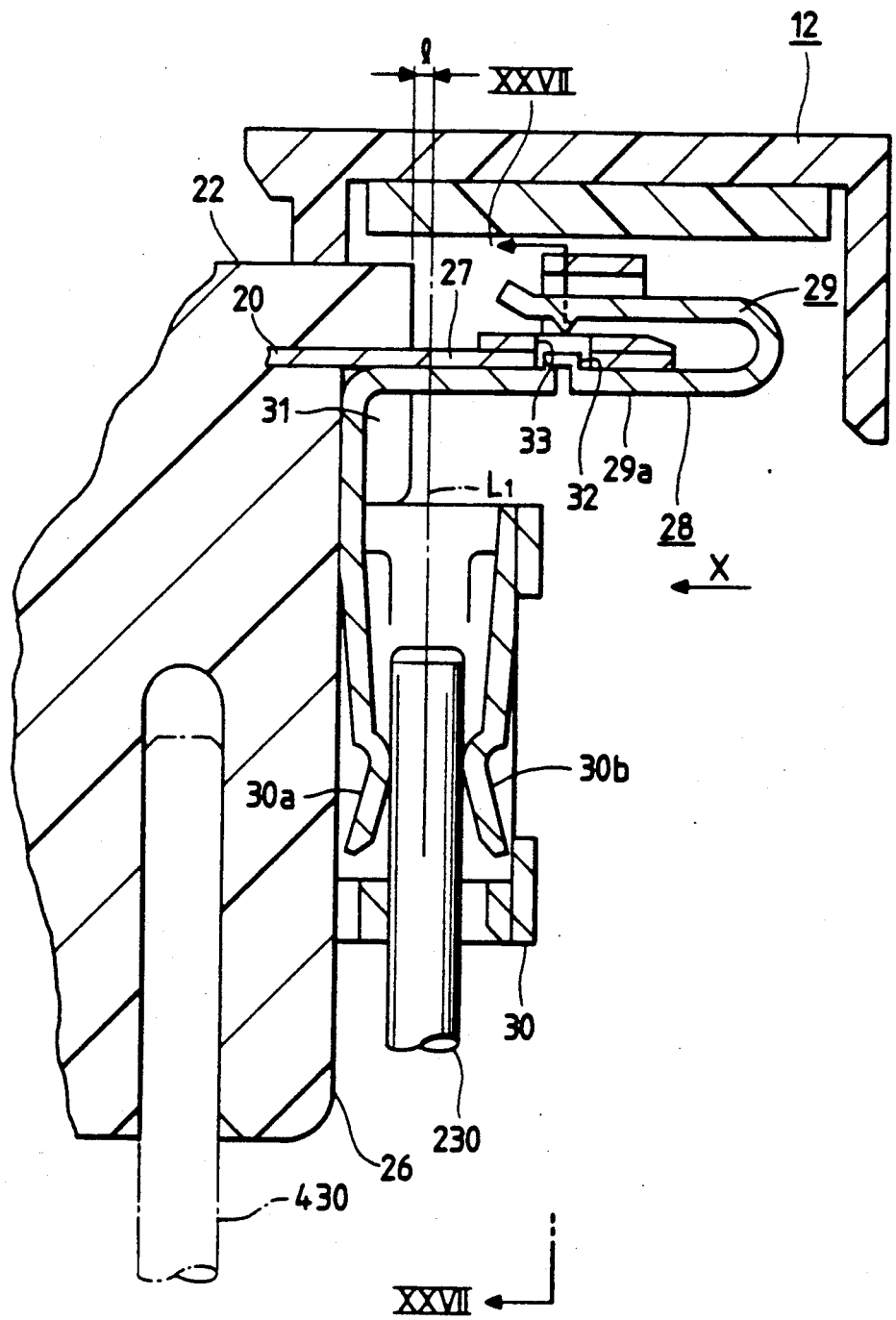
FIG. 26 is a cross-sectional view of a portion of a pointer assembly of the meter device shown in FIG. 22.
Figure 27:
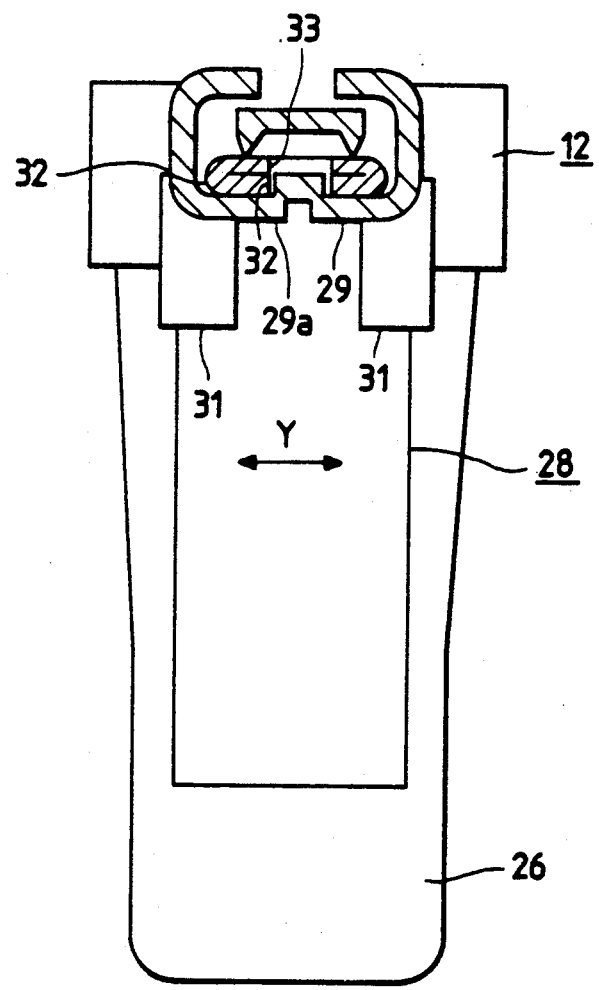
FIG. 27 is a cross-sectional view taken along line XXVII—XXVII of FIG. 26.

The pointer assembly 12 further includes a pair of terminals 28 which constitute first and second current supply members, respectively. The terminals 28 are press-formed from a phosphor bronze sheet and plated with Sn. As shown in FIGS. 26 and 27, each of the terminals 28 includes a hook-shaped upper plug-in socket 29 extending perpendicular to the axis of rotation of the pointer boss 26, and a box-like lower plug-in socket 30 extending in a direction parallel to the axis of rotation of the pointer boss 26. The hook-shaped upper plug-in socket 29 has a resiliency and hence is capable of resiliently holding the corresponding connector terminal 27 when the plug-in socket 29 is forced over and the connector terminal 27 in a direction indicated by the arrow X in FIG. 26. The lower plug-in sockets 29 of the terminals 28 open vertically and constitute first and second connector portions, respectively. Each of the sockets 29 has a pair of opposed resilient grip arms 30a, 30b for gripping a terminal pin 230 or 250 (FIG. 23) when the terminals 28 are fitted over the corresponding terminal pins 230, 250 as the boss 26 is fitted over the meter shaft 430. The terminal pins 230, 250 constitute third and fourth current supply members.

When the hook-shaped plug-in socket 29 of each terminal 28 is fitted over the corresponding connector terminal 27 of the lead frame 20 until the box-like lower plug-in socket 30 abuts against the outer surface of the pointer boss 28, the terminal 28 is positioned relative to the connector terminal 27 in the direction of the arrow X shown in FIG. 26. As shown in FIG. 27, a pair of parallel spaced vertical guide ribs 31 is formed integrally on each side surface of the lead house 22. A portion of each terminal 28 is snugly received between the guide rigs 31 so that the terminal 28 and the corresponding connector terminal 27 are positioned relative to one another in the direction indicated by the arrow Y in FIG. 27. The hook-shaped plug-in socket 28 has a locking projection 32 receivable in a retaining recess 33 in the connector terminal 27 of the lead frame 20 to interlock the terminal 28 and the connector terminal 27 against detachment.

Figure 23:
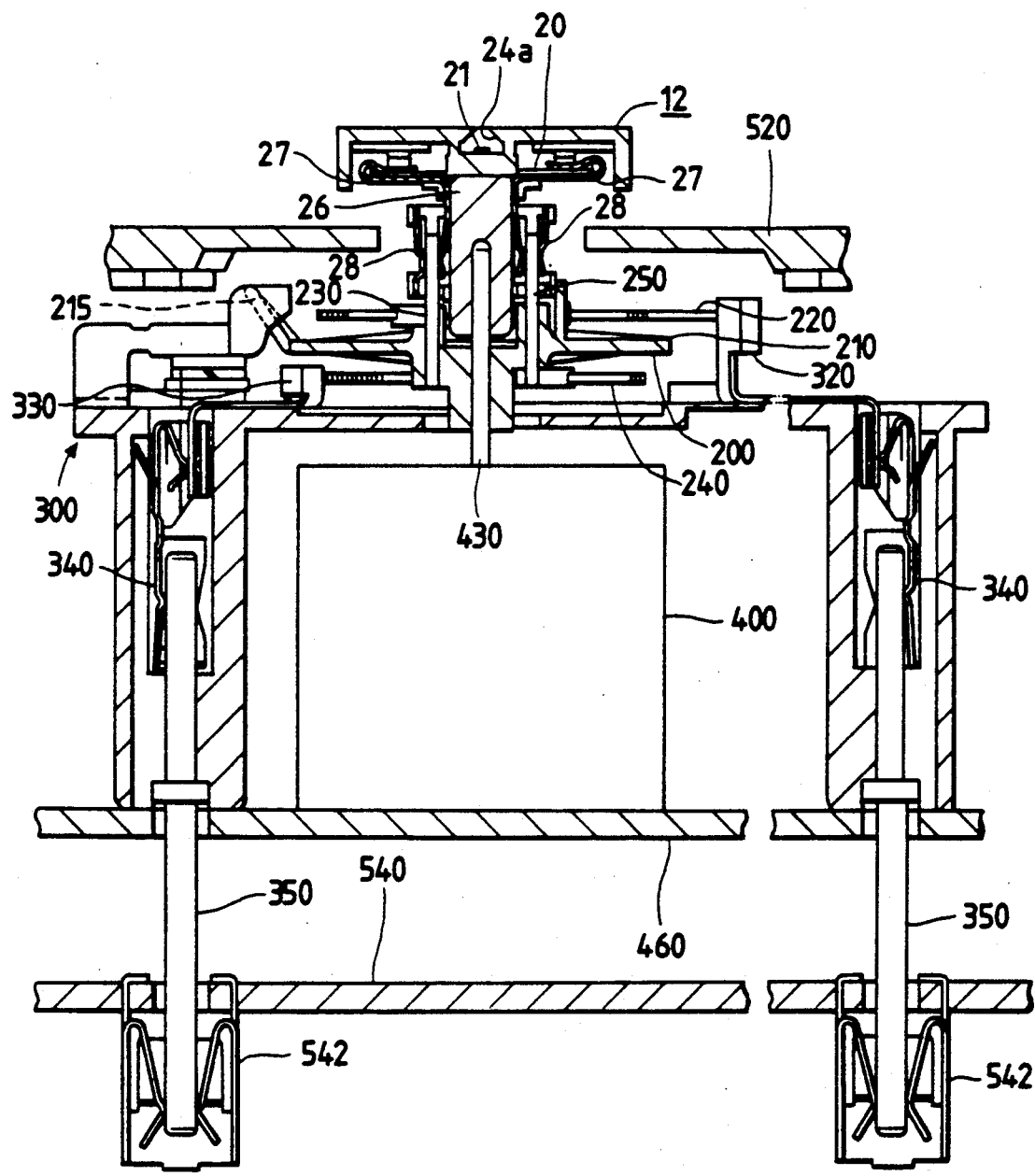
FIG. 23 is a cross-sectional view of the meter device shown in FIG. 22.

When the terminal 28 is connected with the corresponding connector terminal 27, an upper end of the lower plug-in socket 30 is held in abutment with the lower end of the guide ribs 31. With the lower plug-in socket 30 thus vertically retained by the guide ribs 31, the terminal 28 is highly resistant to bending forces applied when the lower plug-in socket 30 is forced over the corresponding terminal pin 230 or 250 (FIG. 23).

The lead frame 20 is also resistant to deformation because a longitudinal axis L1 of the terminal pin 230, 250 is located close to (or spaced a distance l from) the side surface of the head house 22, as shown in FIG. 26. The distance l is small and hence only a small moment of force is applied to the connector terminal 27 when the terminal 28 is forced over the corresponding terminal pin 230, 250.

The front end of the connector terminal 27 is folded on itself so as to insure a reliable resilient deformation of the hook-shaped plug-in socket portion 29 when the socket portion 29 is fitted over the connector terminal 27. Furthermore, since the front end of the connector terminal 27 is folded on itself, the Sn-plated under surface of the lead frame 20 appears also on the upper side of the connector terminal 27. The outer surface of the connector terminal 27 is entirely formed with a Sn-plated surface. It has been proved that Sn-plated surfaces provide a reliable electric contact therebetween when two component parts are electrically connected together. The Sn-plated connector terminal 27 and the Sn-plated terminal 28 can, therefore, provide a reliable electric connection therebetween. It is preferable that the terminal pins 230, 250 are plated with Sn.

In other words, if the connector terminal 27 having an Ag-plated surface is connected with the terminal 28, such connection involves a high contact resistance incurred due to sulfide stain of the Ag-plated surface. When the lead frame 20 is plated with Au, then the terminals 28 and the terminal pins 230, 250 must be plated with Au to provide a reliable contact therebetween. The Au plating is expensive and hence increases the production cost of the meter device. According to the present invention, the Sn-plated connector terminals 27 and the Sn-plated terminals 28 provides a reliable contact therebetween at a minimum cost.

In operation, the pointer drive unit 400 turns the meter shaft 430 in response to an input signal applied thereto, thereby causing the pointer 12 to turn against the force of the spiral springs 220, 240 (FIG. 23). On the other hand, an electric current supplied from the subplate 540 flows successively through one of the plug-in terminals 542, the corresponding terminal pin 350, the corresponding terminal 340, the corresponding fixer terminal 320, 330 (fifth or sixth current supply member), the corresponding spiral hairspring 220, 240, the corresponding terminal pin 230, 250 (third or fourth current supply member), the corresponding terminal 28 (first or second current supply member), the corresponding connector terminal 27 of the lead frame 20, then flows into the LED elements 21. The electric current subsequently returns toward the sub-plate 540 successively through the lead frame 20, the opposite terminal 27 of the lead frame 21, the corresponding terminal 28, the corresponding terminal pin 250, 230, the corresponding spiral hairspring 240, 220, the corresponding fixer terminal 330, 320, the corresponding terminal pin 350 and the corresponding plug-in terminal 542. The electric current thus energizes the LED elements 21 which in turn emit light through the slit 24a of the pointer assembly 12.

As described above, the self-acting light-emitting pointer assembly 12 includes a lead frame 20 having tow connector terminals 27 and a row of LED elements 21 disposed on the lead frame 20 and electrically connected to the connector terminals 27. The lead frame 20 and the LED elements 21 are integrally molded with a synthetic resin with the connector terminals projecting in a direction perpendicular to the axis of rotation of the pointer assembly 12. The connector terminals 27 are plugged in hook-shaped upper plug-in sockets 29 of the respective terminals 28. The terminals also have box-like lower plug-in sockets 30 extending parallel to the axis of rotation of the meter shaft 430. The lower plug-in sockets 30 are automatically fitted with terminal pins 230, 250 when the pointer boss 26 is firmly fitted over the meter shaft 430.

With this plug-in engagement of the terminals, the self-acting light-emitting pointer can be assembled easily and efficiently.

Figure 28:
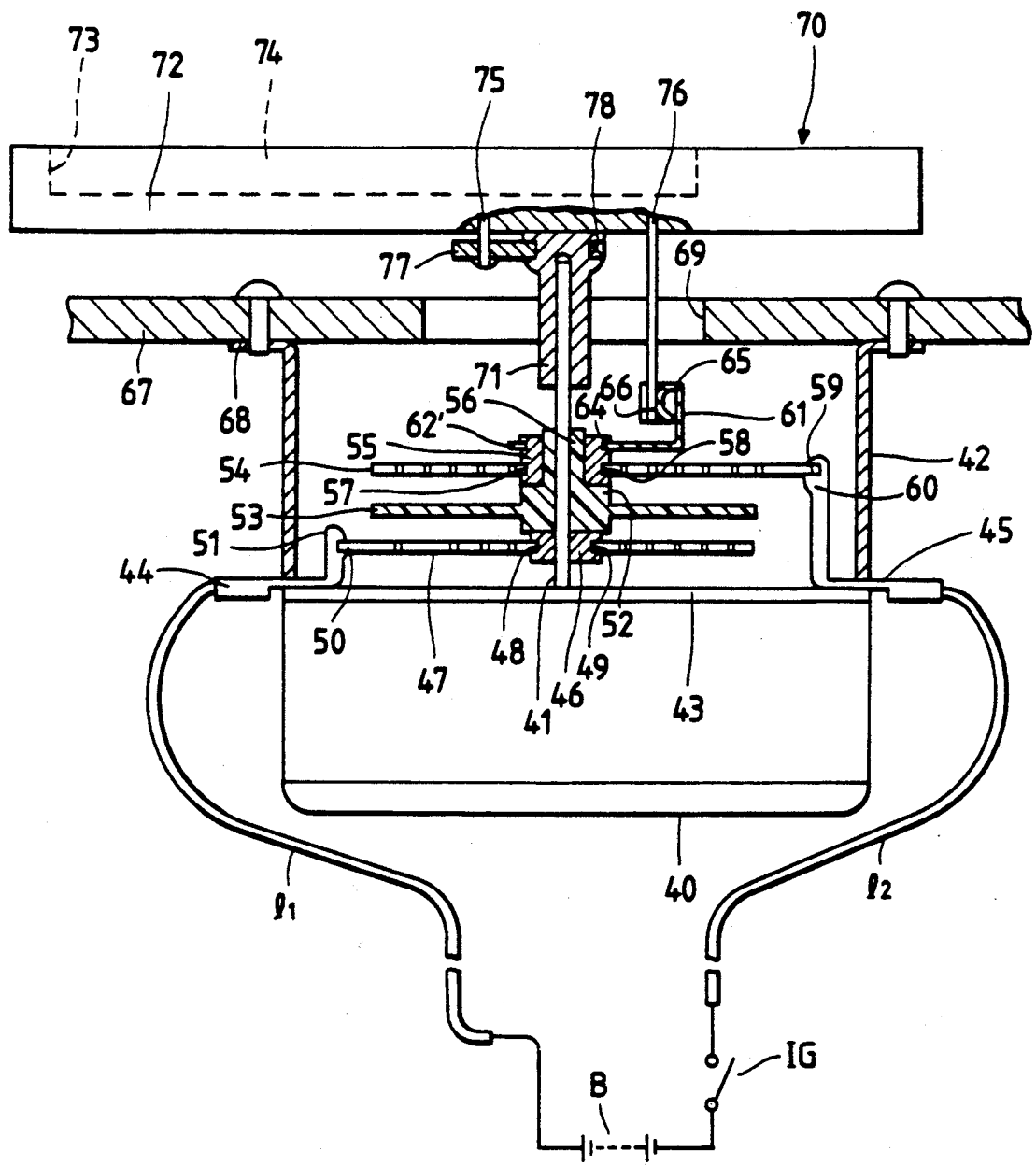
FIG. 28 is a diagrammatical cross-sectional view of a meter device according to a third embodiment of this invention.

A meter device shown in FIG. 28 differs from the meter devices of the foregoing embodiments in that a meter shaft is made of electrically conductive material and solely constitutes a current supply member, and in that a tubular pointer shaft of conductive material is connected with one electrode or terminal of a self-acting light-emitting element and constitutes a current supply member. When the pointer shaft is fitted over the meter shaft to attach a pointer to the pointer shaft, a current flow passage is formed automatically.

The meter device includes a pointer drive unit in the form of a movement 40. The movement 40 is constructed to turn a meter shaft 41 in response to an external signal inputted thereto. The meter shaft 41 is made of electrically conductive metal. The meter device further includes a tubular casing 42 attached to an upper wall 43 of the movement 40 in concentrical relation to the meter shaft 41, with a pair of L-shaped connecter pins 44, 45 disposed between the upper wall 43 and the casing 42. The casing 42 and the upper wall 43 of the movement 40 are made of an electrically insulating material. The connector pins 44, 45 are clinched to the upper wall 43 of the movement 40.

An annular boss 46 made of an electrically conductive material such as brass is concentrically press-fitted over a lower portion of the meter shaft 41. A hairspring 47 on the positive side is formed from a resilient conductive material, such as phosphor bronze for springs, into a flat spiral shape. The spiral hairspring 47 has an inner end 48 clinched to the bottom of an annular groove 49 in the boss 46 in such a manner that the spiral hairspring 47 is concentrical to the boss 50. The outer end 50 of the hairspring 47 is soldered to an upper end 51 of the connector pin 44. The relative position between the upper end 51 of the connector pin 44 and the inner end 48 of the hairspring 47 attached to the boss 50 is properly set to pre-load the hairspring 47.

A substantially tubular insulating member 52 is press-fitted over the meter shaft 41 until it is held in close contact with an upper end face of the boss 46. The insulating member 52 has a circular plate 53 integral with an outer peripheral surface of the insulating member 52. The circular plate 53 serves to separate the hairspring 47 from a hairspring 54 on the negative side.

An annular boss 55 is made of electrically conductive material such as brass and is concentrically press-fitted over a small-diameter portion 56 of the insulating member 52. The hairspring 54 is identical to the hairspring 47 and has an inner end 57 clinched to the bottom of an annular groove 58 in the boss 45 in such a manner that the spiral hairspring 54 is concentrical to the boss 45. The outer end 59 of the hairspring 54 is soldered to an upper end 60 of the connector pin 45, so that the hairspring 54 is pre-loaded in the same degree as the hairspring 47.

A connector 61 is made of a resilient, electrically conductive material such as phosphor bronze for springs and includes an annular connecting portion 62 and an L-shaped connecting portion 63 extending radially outwardly and upwardly from a portion of the outer peripheral edge of the annular connecting portion 62. The annular connecting portion 62 is secured by clinching, for example, to an annular groove 64 in the boss 55. The L-shaped connecting portion 63 has a plug-in socket 65 at an upper end thereof. The plug-in socket 65 extends in a direction parallel to a longitudinal axis of the meter shaft 41 and has a resilient grip finger 66 for a purpose described below.

A dial plate 67 is screwed to an annular upper flange 68 of the casing 42 and has a central hole 69 which is concentrical to the meter shaft 41.

An elongate pointer 70 includes a tubular pointer shaft or boss 81 made of electrically conductive metal. The pointer shaft 81 is press-fitted over the meter shaft 41. An upper end portion of the pointer shaft 41 is fitted with an elongate pointer body 72. The pointer body 72 extends perpendicularly to the pointer shaft 71 and has an longitudinal recess 73 opening to an upper surface of the pointer body 72. A spontaneous or self-acting light-emitting element 74 is fitted in the recess 73 with its light-emitting surface facing upward. The self-acting light-emitting element 74 has a positive connector pin or terminal 75 and a negative connector pin or terminal 75. The positive connector pin 75 projects outwardly from the under surface of the pointer body 72 and is soldered to a terminal plate 77 of conductive metal which is clinched to an annular groove 78 formed in the pointer shaft 71 adjacent to the proximal end thereof. The negative connector pin 76 projects outwardly from the under surface of the pointer body 72 and extends in a direction parallel to a longitudinal axis of the pointer shaft 71. The front end of the negative connector pin 76 is fitted into the plug-in socket 65 of the L-shaped connecting portion 63 and resiliently held therein by means of the resilient grip finger 66. The connector pin 44 is connected with a positive terminal of a source of electric power such as a battery B via a lead wire $1_1$, while the connector pin 45 is connected with a negative terminal of the battery B via a lead wire $1_2$ and an ignition switch IG of an automobile.

In the meter device of the foregoing construction, the connector pin 76 constitutes a first current supply member and the front end of this connector pin 76 constitutes a first connecting portion. The connector pin 75, the conductive terminal plate 77 and the conductive pointer shaft 71 jointly constitute a second current supply member and the conductive pointer shaft 71 solely constitutes a second connecting portion. The connector 61 and the conductive boss 55 jointly constitute a third current supply member and the L-shaped connecting portion 63 and the plug-in socket 65, in particular, constitutes a third connecting portion. The conductive meter shaft 41 and the boss 46 jointly constitute a fourth current supply member. The connector pins 45 and 46 constitute fifth and sixth current supply portions, respectively.

The meter device is assembled in the order described below. After the casing 42 is attached to the movement 40 with the connector pins 44, 45 disposed therebetween, the boss 46 to which the hairspring 47 is clinched at its inner end 48 is press-fitted to a lower portion of the meter shaft 41 and subsequently the outer end 50 of the hairspring 47 is soldered to the upper end 51 of the connector pin 44. In this instance, the relative position between the outer end 50 of the hairspring 47 and the connector pin 44 is adjusted such that a predetermined pre-load is exerted on the hairspring 47.

Then, the insulating member 52 is press-fitted over the meter shaft 41. Subsequently, the boss 55 to which the inner end 57 of the hairspring 54 is clinched is press-fitted over the small-diameter portion 56 of the insulating member 52 and then the outer end 59 of the hairspring 54 is soldered to the upper end 60 of the connector pin 45. During that time, the relative position between the outer end 59 of the hairspring 54 and the connector pin 45 is adjusted to pre-load the hairspring 54. Thereafter, the connector 61 is attached to the boss 55 by clinching the annular connecting portion 62 to the annular groove 64. In this instance, the plug-in socket 65 is disposed in a position which is in registry with the connector pin 76 of the light-emitting element 74 when the pointer body 72 is disposed in the initial position (corresponding to the zero position on the dial plate 67).

Subsequently, the dial plate 67 is screwed onto the upper flange 68 of the casing 42. The meter shaft 41 extends loosely through the central hole 69 of the dial plate 67. Then, the pointer shaft 71 of the pointer 70 is press-fitted over the meter shaft 41 while keeping the connector pin 76 in alignment with the plug-in socket 65 of the connector 61. The pointer 70 is thus mounted on the meter shaft 41. With this mounting of the pointer 70 relative to the meter shaft 41, the connector pin 75 of the self-acting light-emitting element 74 is connected with the positive terminal of the battery B via the terminal plate 77, the pointer shaft 71, the meter shaft 41, the boss 46, the hairspring 47, the connector pin 44, and the lead wire 1$_1$. On the other hand, the connector pin 76 of the self-acting light-emitting element 74 is connected with the negative terminal of the battery B via the connector 61, the boss 55, the hairspring 54, the connector pin 45, the lead wire 1$_2$, and the ignition switch IG.

As described above, press-fitting of the pointer shaft 71 relative to the meter shaft 41 automatically completes a mounting of the pointer 70 relative to the movement 40 and an electric connection between the opposite connector pins 75, 76 of the self-acting light-emitting element 74 and the battery B, at one time. Such mounting and electric connection can be carried out easily and reliably even when the central hole 69 of the dial plate 67 is relatively small. The meter device can, therefore, be assembled efficiently at a low cost. In the assembled condition, the connector pin 76 is firmly retained in the plug-in socket 65 of the connector 61 under the resiliency of the grip finger 65. An accidental detachment between the connector pin 76 and the connector 61 does not take place even when the meter device is subjected to shock force or vibration.

While the ignition switch IG is turned on, an external signal inputted to the movement 40 whereupon the movement 40 turns the meter shaft 41 and the pointer 70 through an angular range corresponding to the input signal. The self-acting light-emitting element 74 is energized by the battery B and emits light according to the magnitude of the applied voltage. The lighting pointer 74 can readily be observed even when the automobile is traveling in the dark. The hairsprings 47, 54 are electrically separated by the circular plate 53 of the insulating member 52 so as not to create a short circuit even when they are subjected shock force or vibration.

Figure 29:
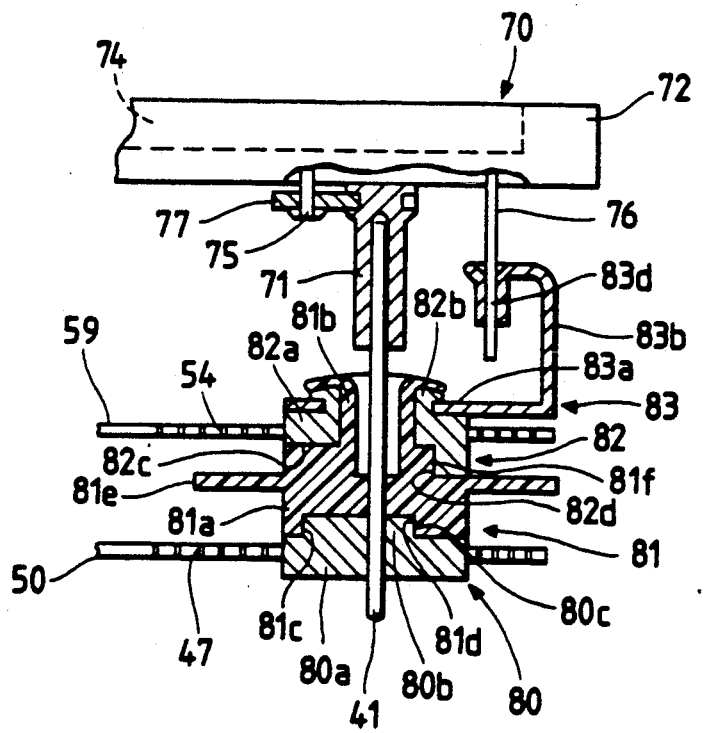
FIG. 29 is a cross-sectional view showing a main portion of a modified meter device.
Figure 30:
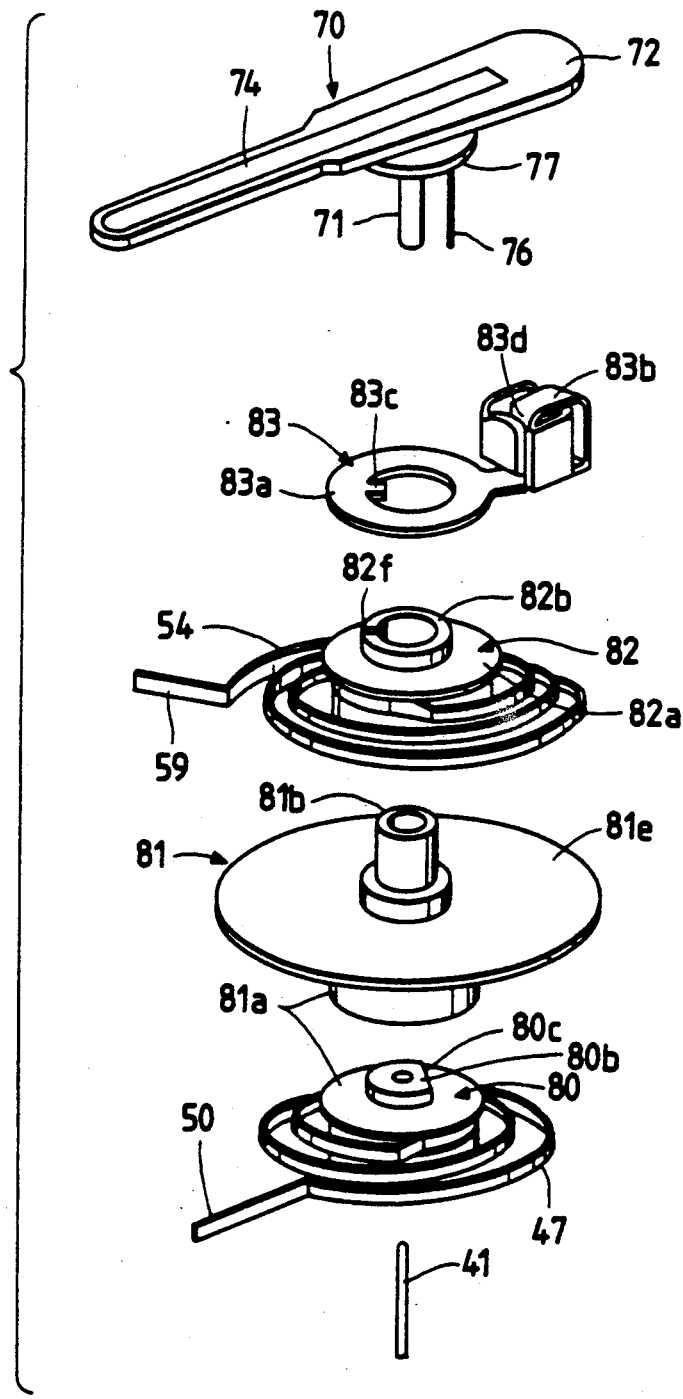
FIG. 30 is an exploded perspective view of the modified meter device.

FIGS. 29 and 30 shows a modified form of the meter device according to the present invention. The modified meter device is substantially the same as the meter device shown in FIG. 28 with the exception that a boss 80, an insulating member 81, a boss 82 and a connector 83 can be assembled one above another without the need for a positional adjustment relative to one another.

The boss 80 is composed of a large-diameter portion 80a to which a hairspring 47 is attached, and a small-diameter portion 80b. The small-diameter portion 80b is substantially D shape and having a flat guide surface 80c facing radially outwardly of the boss 80.

The insulating member 81 is composed of a large-diameter portion 81a and a small-diameter portion 81b. The large-diameter portion 81a has in its under surface a substantially D-shaped guide recess 81c (FIG. 29) which is complementary in contour to the shape of the small-diameter portion 80b of the boss 80 and hence is snugly receptive of the small-diameter portion 80b. The D-shaped guide recess 81c has a flat guide surface 81d (FIG. 29) held in abutment with the flat guide surface 80c of the boss 80, so that the insulating member 81 is positioned relative to the boss 80 in the circumferential direction. The large-diameter portion 81a includes a circular plate 81e for separating the hairspring 47 and a hairspring 54. The large-diameter portion 81a is partly cutout to provide a second flat guide surface 81f (FIG. 29) disposed on an upper side of the circular plate 81e and extending parallel to the flat guide surface 81d.

The boss 82 is composed of a large-diameter portion 82a to which the hairspring 54 is attached, and a small-diameter portion 82b integral with the large-diameter portion 82a. The hairspring 54 is attached such that the outer end 59 of this hairspring 54 is disposed on the same side of the outer end 50 of the hairspring 47. The large-diameter portion 82a has in its under surface a recess 82c (FIG. 29) having a flat guide surface 82d (FIG. 29) extending parallel to the second guide surface 81f of the insulating member 81. When the boss 82 is fitted over the insulating member 81, the flat guide surface 82d is held in abutment with the second guide surface 81f. The boss 82 is thus positioned relative to the insulating member 81 in the circumferential direction.

The connector 83 includes an annular connecting portion 83a snapped with the small-diameter portion 82b of the boss 82, and an L-shaped connecting portion 83b extending radially outwardly and upwardly from an outer edge of the annular connecting portion 83a. The annular connecting portion 83a has a locking prong 83c (FIG. 30) projecting from an inner edge of the connecting portion 83a. The locking prong 83c is fitted with a radial groove 82f (FIG. 30) formed in the small-diameter portion 82b of the boss 82, so that the connector 83 is positioned relatively to the boss 82 in the circumferential direction. The L-shaped connecting portion 83b has a plug-in socket 83d at the upper end thereof. The plug-in socket 83d resiliently retains therein a connector pin 76 of the pointer 70. The upper end of the insulating member 81 is thermally fused to join the insulating member 81 and the boss 82, as shown in FIG. 29.

Since the relative angular movement is restricted jointly by the guide surfaces 80c, 81d, 81f, 82d, the locking prong 83c and the radial groove 82f, the boss 80, the insulating member 81, the boss 82 and the connector 83 can be assembled accurately with utmost ease merely by staking them one above another.

Figure 32:
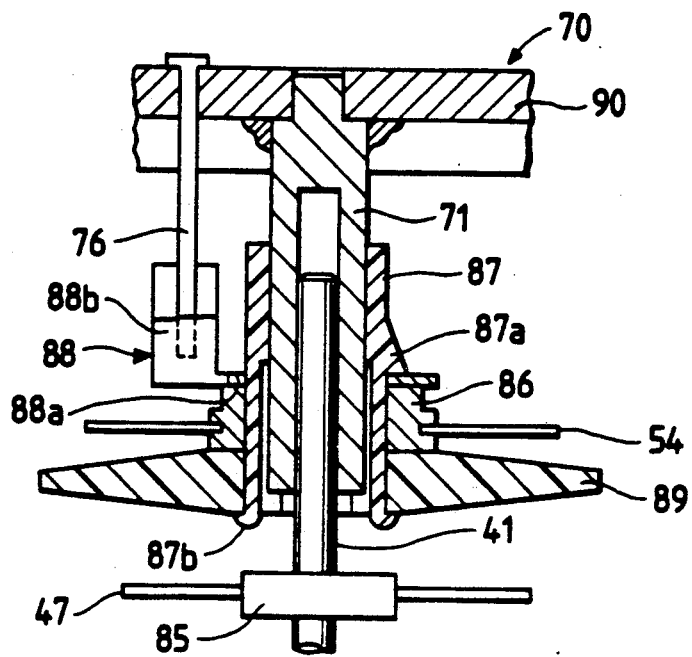
FIG. 32 is an enlarged cross-sectional view showing a main portion of the meter device shown in FIG. 31.
Figure 31:
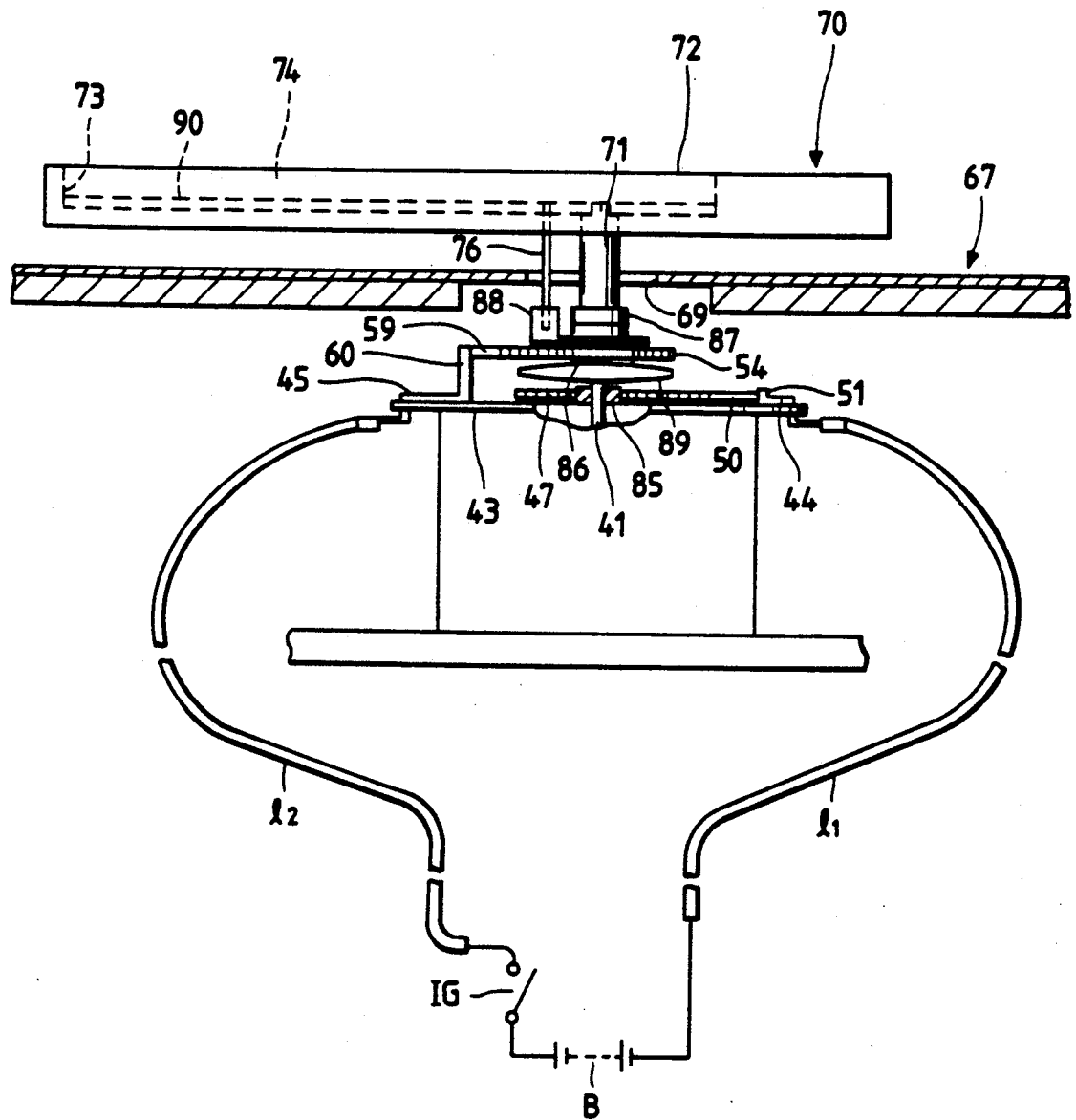
FIG. 31 is a schematic cross-sectional view of a meter device according to a fourth embodiment of this invention.
Figure 33:
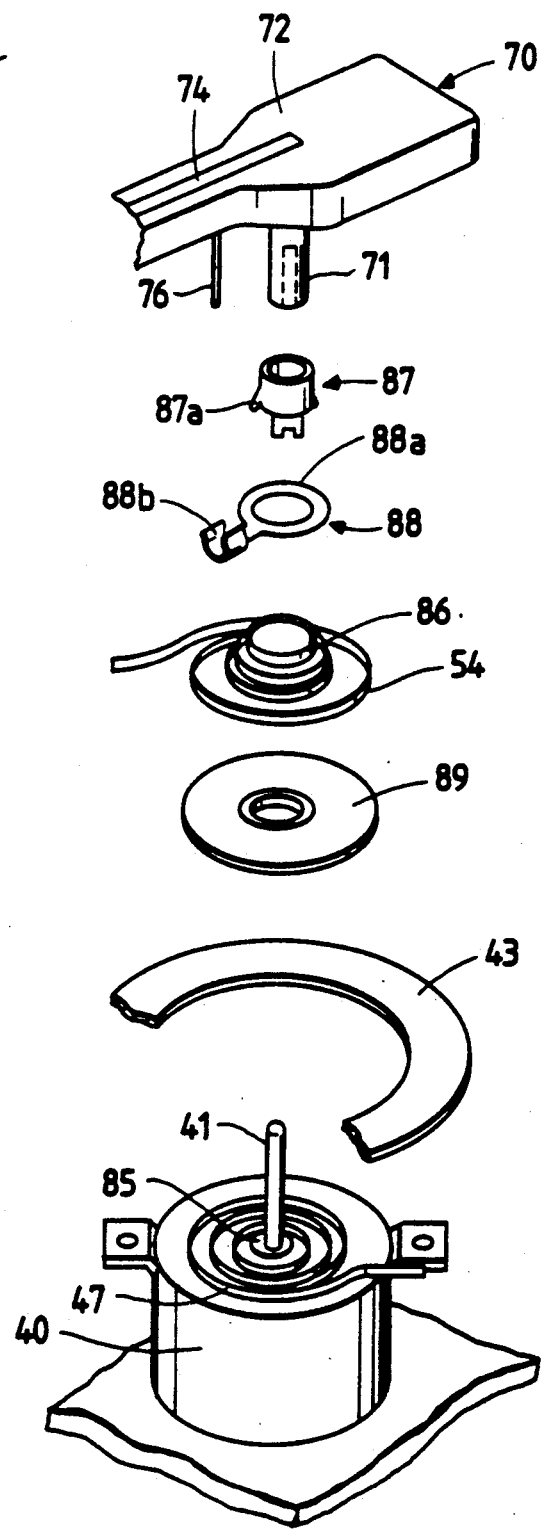
FIG. 33 is an exploded perspective view of the meter device of FIG. 31.

A meter device shown in FIGS. 31 through 33 is similar to the meter devices of the foregoing embodiments shown in FIGS. 28 through 30 but differs therefrom in that a first conductive boss 85 is fitted over the meter shaft 41 while a second conductive boss 86 is mounted by an insulating member 87 on the conductive tubular pointer shaft 71 together with a connector 88. With the structural similarity in view, these components which are identical or correspond to those of the meter device shown in FIG. 2B are designated by identical reference characters and a further description will not given to these components.

The first boss 85 which is made of electrically conductive metal is fitted over the meter shaft 41 and connected to the inner end of a hairspring 47 in the same manner as the boss 46 shown in FIG. 28.

As shown in FIG. 2, the insulating member 87 is a substantially tubular body and has a pair plurality of shoulders 87a projecting from an outer peripheral surface thereof. The tubular insulating member 87 is press-fitted over the conductive pointer shaft 71.

The second boss 86 which is made of electrically conductive metal is fitted over the insulating member 87 with an annular connecting portion 88a of the connector 88 disposed between the shoulders 87a and the second boss 86. The second boss 86 is joined with the inner end of a hair-spring 54.

The connector 88 also has a plug-in socket 88b integral with the annular connecting portion 88a and extending parallel to a longitudinal axis of the pointer shaft 71. The plug-in socket 88b is of an inverted $\Omega$ shape and resiliently retains therein a connector pin 76 extending downwardly from the body 72 of a pointer 70.

An annular insulating plate 89 is fitted over the tubular insulating member 87 to hold the second boss 86 between itself and the annular connecting portion 88a of the terminal 88. The lower end 87b of the tubular insulating member 87 is joined by fusing or clinching to the annular insulating plate 89. The annular insulating plate 89 is disposed between the two hairsprings 47, 54 and electrically separated these hairsprings 47, 54. In FIGS. 31 and 32, designated by 90 is a circuit board through which the conductive pointer shaft 71 and the connector pin 76 are electrically connected with opposite electrodes or terminals of the light-emitting element 74.

In assembling the meter device, the first boss 85 is attached to the conductive meter shaft 41 and the second boss 86 and the connector 88 are attached to the conductive pointer shaft 71 via the insulating member 87 and the insulating plate 89. Then, the pointer shaft 71 is press-fitted over the meter shaft 41. In this instance, the connector pin 76 is plugged into the socket 88b of the connector 88. Thus, a mounting of the pointer 70 relative to the drive unit 40 and an electric connection between the opposite terminals or connectors of the light-emitting element 74 are completed simultaneously.

Obviously, various minor changes and modifications of the present invention are possible in the light of the above teaching. It is therefore to be understood that within the scope of the appended claims the invention may be practiced otherwise than as specifically described.

What is claimed is:

1. A meter device for a motor vehicle, comprising:
   (a) a pointer drive unit for rotating a meter shaft in response to an input signal;
   (b) a self-acting light-emitting pointer fixedly mounted on said meter shaft for co-rotation therewith, said pointer including a light-emitting element having first and second electrodes, and first and second current supply members connected, at one and thereof, to said first and second electrodes, respectively, and having, at the opposite end thereof, first and second connecting portions, respectively, said first and second connecting portions extending in a direction substantially parallel to a longitudinal axis of said meter shaft;
   (c) third and fourth current supply members having, at one end thereof, third and fourth connecting portions, respectively, and connected, at the opposite end, to one end of first and second metallic spiral springs, respectively, said third and fourth connecting portions extending in said direction and being releasably engaged with said first and second connecting portions, respectively, so that said first and second current supply members are electrically connected with said third and fourth current supply members, respectively, at the same time when said self-acting light-emitting pointer is mounted on said meter shaft; and
   (d) fifth and sixth current supply members connected to the opposite end of said first and second spiral springs for supplying an electric current to said first and second spiral springs.

2. A meter device according to claim 1, wherein said light-emitting element is an elongated bar, said self-acting light-emitting pointer further including a pointer boss having a tubular shaft disposed centrally between said first and second connecting portions and firmly fitted over said meter shaft, and a resilient retaining portion extending perpendicular to a longitudinal axis of said pointer shaft and resiliently retaining thereon said elongate light-emitting element.

3. A meter device according to claim 2, wherein said first and second current supply members are retained on said retaining portion of said pointer boss 4. A meter device according to claim 1, wherein said first and second current supply members have a same construction and each have a resilient grip portion releasably engageable with the corresponding electrode.

5. A meter device according to claim 1, wherein said light-emitting element is an elongate hollow cylindrical discharge tube and has first and second power-receiving portions disposed on an outer surface thereof and electrically connected with said first and second electrodes, respectively, each of said first and second current supply members further having at said one end a resilient grip portions snap-fitted over corresponding one of said first and second power-receiving portions.

6. A meter device for a motor vehicle, comprising:
   (a) a pointer drive unit for rotating a meter shaft in response to an input signal, said meter shaft being made of an electrically conductive material;
   (b) a self-acting light-emitting pointer having a tubular pointer shaft firmly fitted with said member shaft for co-rotation therewith, said pointer including a light-emitting element having first and second electrodes, a first current supply member connected, at one end thereof, with said first electrode and having, at the opposite end thereof, a first connecting portion extending in a direction substantially parallel to a longitudinal axis of said pointer shaft, and a second current supply member connected, at one end thereof, with said second electrode and having a second connecting portion constituting said pointer shaft;
   (c) a third current supply member having, at one end thereof, a third connecting portion extending in a direction substantially parallel to said meter shaft and connected, at the opposite end thereof, with one end of a first metallic spiral spring, said third connecting portion being releasably engaged with said first connecting portion so that said first and third current supply members are electrically connected together at the same time when said pointer shaft is fitted over said meter shaft to electrically connect said second current supply member and said meter shaft, said meter shaft constituting a fourth current supply member;

(d) a second metallic spiral spring connected at one end with said meter shaft; and (e) fifth and six current members connected to the opposite ends of said first and second spiral springs, respectively, for supplying an electric current to said first and second spiral springs.

7. A meter device for a motor vehicle, comprising:

(a) a pointer drive unit for rotating a meter shaft in response to an input signal;

(b) a self-acting light-emitting pointer fixedly mounted on said meter shaft for co-rotation therewith, said pointer including a light-emitting element having first and second electrodes, and first and second current supply members connected at one end thereof, to said first and second electrodes, respectively, and having at the opposite end, first and second connecting portions, respectively, said first and second connecting potions extending in a direction substantially parallel to a longitudinal axis of said meter shaft, each of said first and second connecting portions having a pair of opposed resilient grip arms;

(c) third and fourth current supply members having at one end thereof, third and fourth connecting portions, respectively, extending in said direction, each of said third and fourth connecting portions being a terminal pin resiliently held by and between said resilient grip arms of a corresponding connecting portion to electrically connect said first and second current supply members and said third and fourth current supply members simultaneously when said self-acting light emitting pointer is mounted on said meter shaft; and (d) fifth and sixth current supply members connected, at one end thereof to a power source and at the opposite end thereof, to the opposite end of said third and fourth current supply members, respectively.

8. A meter device according to claim 7, further including a turn plate fixedly mounted on said meter shaft, said terminal pins being supported on said turn plate in symmetrical relation to each other about an axis of rotation of said turn plate.

9. A meter device for a motor vehicle, comprising:

(a) a pointer drive unit for rotating a meter shaft in response to an input signal;

(b) a self-acting light-emitting pointer fixedly mounted on said meter shaft for co-rotation therewith, said pointer including a light-emitting element having first and second electrodes, and first and second current supply members connected at one end thereof, to said first and second electrodes, respectively, and having at the opposite end, first and second connecting portions, respectively, said first and second connecting portions extending in a direction substantially parallel to a longitudinal axis of said meter shaft;

(c) third and fourth current supply members having at one end thereof, third and fourth connecting portions, respectively, extending in said direction, said third and fourth connecting portions being releasably engaged with said first and second connecting portions, respectively to electrically connect said first and second current supply members and said third and fourth current supply members simultaneously when said self-acting light-emitting pointer is mounted on said meter shaft; and (d) fifth and sixth current supply members connected, at one end thereof, to a power source and at the opposite end thereof, to the opposite end of said third and fourth current supply members, respectively, said self-acting light-emitting pointer including an elongate conductive lead frame, and a row of light-emitting diode tips disposed on said lead frame and molded with synthetic resin together with said lead frame, said light-emitting diode tips constituting said light-emitting element, said lead frame having first and second connector terminals connected with said first and second electrodes of said light-emitting element, respectively, and disposed on the outside of said pointer, each of said first and second current supply members having at said one end thereof a plug-in-socket resiliently holding therein corresponding one of said first and second connector terminals.

10. A meter device according to claim 9, wherein said pointer includes a tubular shaft disposed centrally between said first and second current supply members and firmly fitted over said meter shaft, said first and second connector terminals are disposed in symmetrical relation to one another about a longitudinal axis of said tubular shaft and extending perpendicularly to said longitudinal axis.

11. A meter device according to claim 10, wherein said tubular shaft has two pairs of spaced longitudinal ribs on its outer peripheral surface, said ribs being held in abutment with said first and second connecting portions to preclude deformation of said first and second current supply members when said first and second current supply members are engaged with said third and fourth current supply members.

12. A meter device according to claim 11, wherein each of said first and second current supply members is snugly received between one pair of said longitudinal ribs.

13. A meter device according to claim 9, wherein said plug-in socket has a hook shape.

14. A meter device according to claim 9, wherein each of said connector terminals has a retaining recess, said plug-in socket having a locking projection lockingly engageable with said retaining recess.

15. A meter device for a motor vehicle, comprising:

(a) a pointer drive unit for rotating a meter shaft in response to an input signal;

(b) a self-acting light-emitting pointer fixedly mounted on said meter shaft for co-rotation therewith, said pointer including a light-emitting element having first and second electrodes and first and second current supply members connected at one end thereof, to said first and second electrodes, respectively, and having at the opposite end, first and second connecting portions, respectively said first and second connecting portions extending in a direction substantially parallel to a longitudinal axis of said meter shaft, each of said first and second connecting portions having a pair of opposed resilient grip arms;

(c) third and fourth current supply members having, at one end thereof, third and fourth connecting portions, respectively, and connected, at the opposite end, to one end of first and second metallic spiral springs, respectively, said third and fourth connecting portions extending in said direction, each of said third and fourth current supply members being a terminal pin resiliently held by and between said resilient grip arms of a corresponding connection of portion to electrically connect said first and second current supply members and said third and fourth current supply members simultaneously when said self-acting light-emitting pointer is mounted on said meter shaft; and (d) fifth and sixth current supply members connected, at one end of said first and second spiral springs for supplying an electric current to said first and second spiral springs.

16. A meter device according to claim 15, further including a turn plate fixedly mounted on said meter shaft, said terminal pins being supported on said turn plate in symmetrical relation to each other about an axis of rotation of said turn plate.

17. A meter device according to claim 16, wherein said first spiral spring is disposed adjacent to one end face of said turn plate, said second spiral spring being disposed adjacent to the opposite end face of said turn plate.

18. A meter device according to claim 17, wherein said fifth and sixth current supply members are disposed at a substantially same level as said opposite end of said first and second spiral springs and clinched with said first and second spiral springs, respectively.

19. A meter device for a motor vehicle, comprising:
(a) a pointer drive unit for rotating a meter shaft in response to an input signal;
(b) a self-acting light-emitting pointer fixedly mounted on said meter shaft for co-rotation therewith, said pointer including a light-emitting element having first and second electrodes and first and second current supply members connected at one end thereof, to said first and second electrodes, respectively, and having at the opposite end thereof, first and second connecting portions, respectively, said first and second connecting portions extending in a direction substantially parallel to a longitudinal axis of said meter shaft;
(c) third and fourth current supply members having, at one end thereof, third and fourth connecting portions, respectively, and connected at the opposite end, to one end of first and second metallic spiral springs, respectively, said third and fourth connecting portions extending in said direction and being releasably engaged with said first and second connecting portions, respectively, to electrically connect said first and second current supply members and said third and fourth current supply members simultaneously when said self-acting light-emitting pointer is mounted on said meter shaft; and
(d) fifth and sixth current supply members connected to the opposite end of said first and second spiral springs for supplying an electric current to said first and second spiral springs, said self-acting light-emitting pointer including an elongate conductive lead frame, and a row of light-emitting diode tips disposed on said lead frame and molded with synthetic resin together with said lead frame, said light-emitting diode tips constituting said light-emitting element, said lead frame having first and second connector terminals connected with said first and second electrodes of said light-emitting element, respectively, and disposed on the outside of said pointer, each of said first and second current supply members having at said one end thereof a plug-in socket resiliently holding therein corresponding one of said first and second connector terminals.

20. A meter device according to claim 19, wherein said pointer includes a tubular shaft disposed centrally between said first and second current supply members and firmly fitted over said meter shaft, said first and second connector terminals are disposed in symmetrical relation to one another about a longitudinal axis of said tubular shaft and extending perpendicularly to said longitudinal axis.

21. A meter device according to claim 20, wherein said tubular shaft has two pairs of spaced longitudinal ribs on its outer peripheral surface, said ribs being held in abutment with said first and second connecting portions to preclude deformation of said first and second current supply members when said first and second current supply members are engaged with said third and forth current supply members.

22. A meter device according to claim 21, wherein each of said first and second current supply members is snugly received between one pair of said longitudinal ribs.

23. A meter device according to claim 19, wherein said plug-in socket has a hook shape.

24. A meter device according to claim 19, wherein each of said connector terminals has a retaining recess, said plug-in socket having a locking projection lockingly engageable with said retaining recess.

25. A meter device for a motor vehicle comprising:
(a) a pointer drive unit for rotating a meter shaft in response to an input signal, said meter shaft being made of an electrically conductive material;
(b) a self-acting light-emitting pointer having a tubular pointer shaft firmly fitted with said meter shaft for co-rotation therewith, said pointer including a light-emitting element having first and second electrodes, a first current supply member being a connector pin connected at one end thereof, with said first electrode and having at the opposite end thereof, a first connecting portion extending in a direction substantially parallel to a longitudinal axis of said pointer shaft, and a second current supply member connected at one end thereof, with said second electrode and having a second connecting portion constituting said pointer shaft;
(c) A third current supply member having at one end thereof, a third connecting portion extending in a direction substantially parallel to said meter shaft and connected at the opposite end thereof, with one end of a first metallic spiral spring, said third connecting portion being a plug-in socket fitted over said connector pin to electrically connect said first and third current supply members simultaneously when said pointer shaft is fitted over said meter shaft to electrically connect said second current supply member and said meter shaft, said meter shaft constituting a fourth current supply member;

(d) a second metallic spiral spring connected at one end with said meter shaft; and (e) fifth and sixth current supply members connected to the opposite ends of said first and second spiral springs, respectively, for supply an electric current to said first and second spiral springs.

26. A meter device for a motor vehicle, comprising:

(a) a pointer drive unit for rotating a meter shaft in response to an input signal, said meter shaft being made of an electrically conductive material;

(b) a self-acting light-emitting pointer having a tubular pointer shaft firmly fitted with said meter shaft for co-rotation therewith, said pointer including a light-emitting elements having first and second electrodes, a first current supply member connected at one end thereof, with said first electrode and having at the opposite end thereof, a first connecting portion extending in a direction substantially parallel to a longitudinal axis of said pointer shaft, and a second current supply member connected at one end thereof, with said second electrode and having a second connecting portion constituting said pointer shaft;

(c) a third current supply member having at one end thereof, a third connecting portion extending in a direction substantially parallel to said meter shaft and connected at the opposite end thereof, with one end of a first metallic spiral spring, said third connecting portion being releasably engaged with said first connecting portion to electrically connect said first and third current supply members simultaneously when said pointer shaft is fitted over said meter shaft to electrically connect said second current supply member and said meter shaft, said meter shaft constituting a fourth current supply member;

(d) a second metallic spiral spring connected at one end with said meter shaft;

(e) fifth and sixth current supply members connected to the opposite ends of said first and second spiral springs, respectively, for supply an electrical current to said first and second spiral springs; and (f) an insulating member firmly fitted over said conductive meter shaft;

said fourth current supply member further including a first boss of electrically conductive material firmly fitted over said conductive meter shaft at one side of said insulating member and joined with an inner end of said second spiral spring, said third current supply member including a second boss of electrically conductive material firmly fitted over said insulating member at the opposite side of the latter and joined with an inner end of said first spiral spring, and a connector joined with said second boss and having said third connecting portion.

27. A meter device according to claim 26, wherein said first current supply member is a connector pin and said third connecting portion is a plug-in socket fitted over said connector pin.

28. A meter device according to claim 26, wherein said insulating member includes a circular plate disposed between said first and second spiral springs for electrically separating the first and second spiral springs.

29. A meter device according to claim 26, wherein said insulating member is non-rotatably fitted over said first boss and said second boss is non-rotatably fitted over said insulating member.

30. A meter device according to claim 29, wherein said first boss includes a large-diameter portion and a small-diameter portion, said small diameter portion being a substantially D shape and having a first flat guide surface facing radically outwardly of said first boss, said insulating member having a large-diameter portion and a small-diameter portion, said large-diameter portion of said insulating member having a substantially D-shaped recess complementary in contour to the shape of said D-shaped small-diameter portion of said first boss and fitted over said D-shaped small-diameter portion, said D-shaped recess having a second flat guide surface held in abutment with said first flat guide surface, said large-diameter portion of said insulating member further having a third flat guide surface facing radially outwardly of said insulating member and extending parallel to said second flat guide surface, said second boss including a large-diameter portion and a small-diameter portion, said large-diameter portion of said second boss having a fourth flat guide surface held in abutment with said third flat guide surface of said insulating member, said small-diameter portion of said second boss having a radial groove, said connector including a locking prong fitted with said radial groove of said second boss.

31. A meter device for a motor vehicle, comprising:

(a) a pointer drive unit for rotating a meter shaft in response to an input signal, said meter shaft being made of an electrically conductive material;

(b) a self-acting light-emitting pointer having a tubular pointer shaft firmly fitted with said meter shaft for co-rotation therewith, said pointer including a light-emitting element having first and second electrodes, a first current supply member connected at one end thereof, with said first electrode and having at the opposite end thereof, a first connecting portion extending in a direction substantial parallel to a longitudinal axis of said pointer shaft, and a second current supply member connected at one end thereof, with said second electrode and having a second connecting portion constituting said pointer shaft;

(c) a third current supply member having, at one end thereof, a third connecting portion extending in a direction substantially parallel to said meter shaft and connected, at the opposite end thereof, with one end of a first metallic spiral spring, said third connecting portion being releasably engaged with said first connecting portion to electrically connect said first and third current supply members simultaneously when said pointer shaft is fitted over said meter shaft to electrically connect said second current supply member and said meter shaft, said meter shaft constituting a fourth current supply member;

(d) a second metallic spiral spring connected at one end with said meter shaft;

(e) fifth and sixth current supply members connected to the opposite ends of said first and second spiral springs, respectively, for supply an electric current to said first and second spiral springs; and (f) an insulating member firmly fitted over said conductive pointer shaft;

said fourth current supply member further including a first boss of electrically conductive material firmly fitted over said conductive meter shaft and joined with an inner end of said second spiral spring, said third current supply member including a second boss of electrically conductive material firmly fitted over said insulating member and joined with an inner end of said first spiral spring, and a connector joined with said second boss and having said third connecting portion.

32. A meter device according to claim 31, wherein said first current supply member is a connector pin and said third connecting portion is a plug-in socket fitted over said connector pin.

33. A meter device according to claim 31, further including an annular insulating plate fitted over said insulating member and disposed between said first and second bosses to electrically separating said first and second spiral springs.

* * * * *